United States Patent [19]

Russell

[11] Patent Number: 5,056,080
[45] Date of Patent: Oct. 8, 1991

[54] OPTICAL RECORDING/REPRODUCING SYSTEM USING INTERFERENCE TECHNIQUES

[76] Inventor: James T. Russell, 15305 SE. 48th Dr., Bellevue, Wash. 98006

[21] Appl. No.: 410,943

[22] Filed: Sep. 22, 1989

[51] Int. Cl.$^5$ .............................................. G11B 7/00
[52] U.S. Cl. .................................. 369/100; 369/109; 369/44.26; 369/103; 369/112
[58] Field of Search ..................... 369/44.26, 100, 109, 369/103, 124, 112; 365/106

[56] References Cited

U.S. PATENT DOCUMENTS 3,753,249 8/1973 Silverman ........................ 369/109 X
3,971,002 7/1976 Bricot et al. ..................... 369/109 X Primary Examiner—Robert C. Richardson
Attorney, Agent, or Firm—Larry A. Jackson

[57] ABSTRACT

Apparatus and method are disclosed for encoding information and recording same as sets of variably spaced related marks on the optical record. The encoded information is read by illuminating each set of such recorded marks with a coherent read light to cause an optical interference pattern consisting of a varying distribution of amplitude maxima separated by amplitude nulls (or minimas) that change in accordance with the encoded information. This read interference pattern is detected by photosensing diode arrays and after decoding, the system outputs an information signal representing the original information.

30 Claims, 15 Drawing Sheets

RECORDING

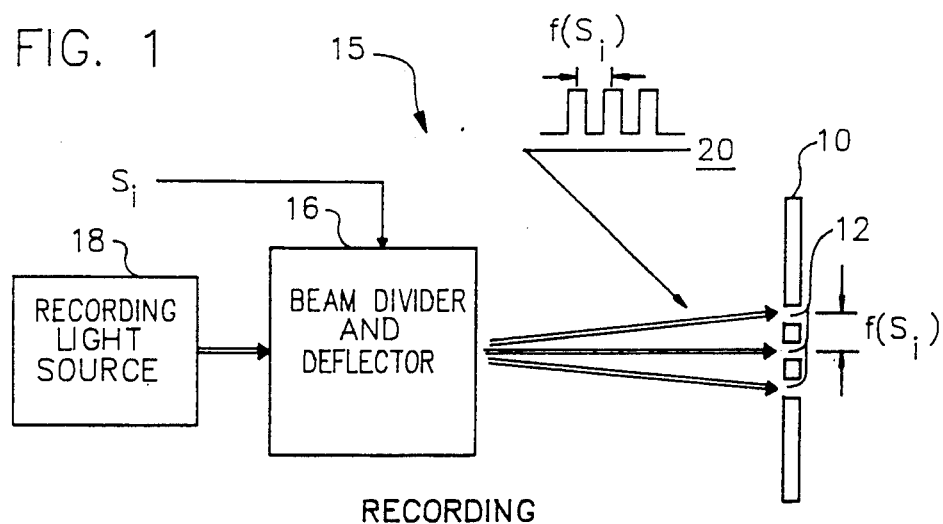
FIG. 1 RECORDING
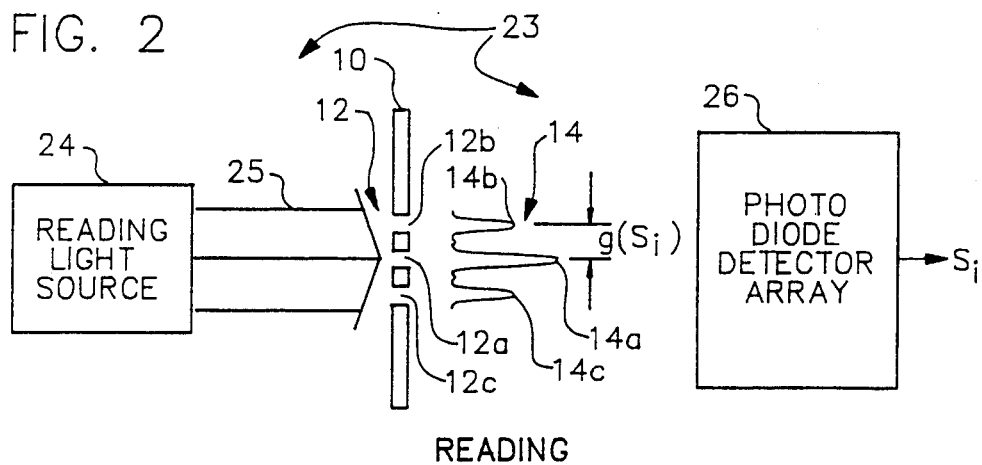
FIG. 2 READING
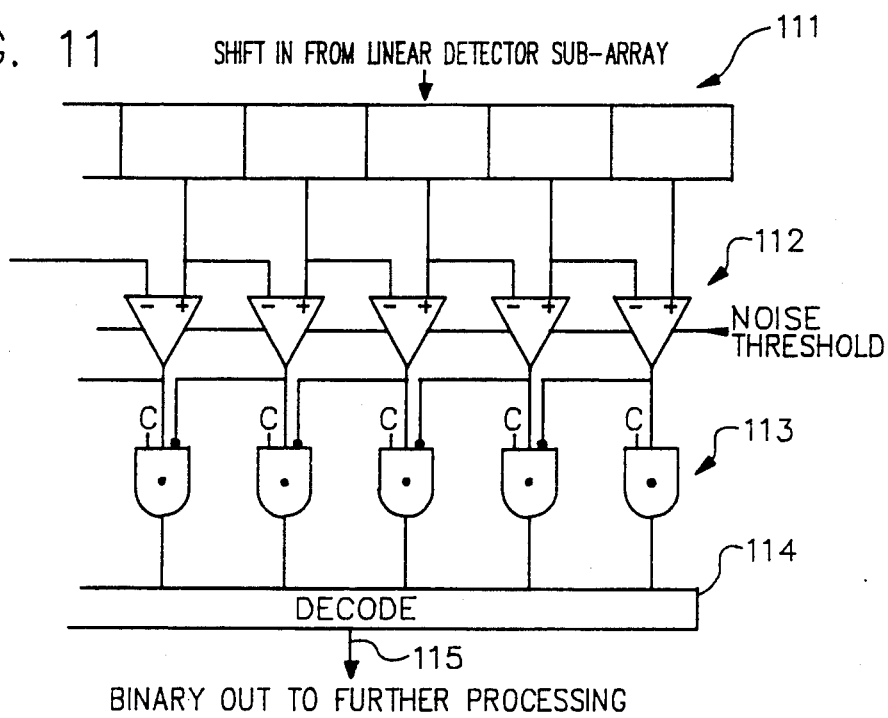
FIG. 11

3-MARK SETS

2-MARK SETS

READ-OUT PATTERN

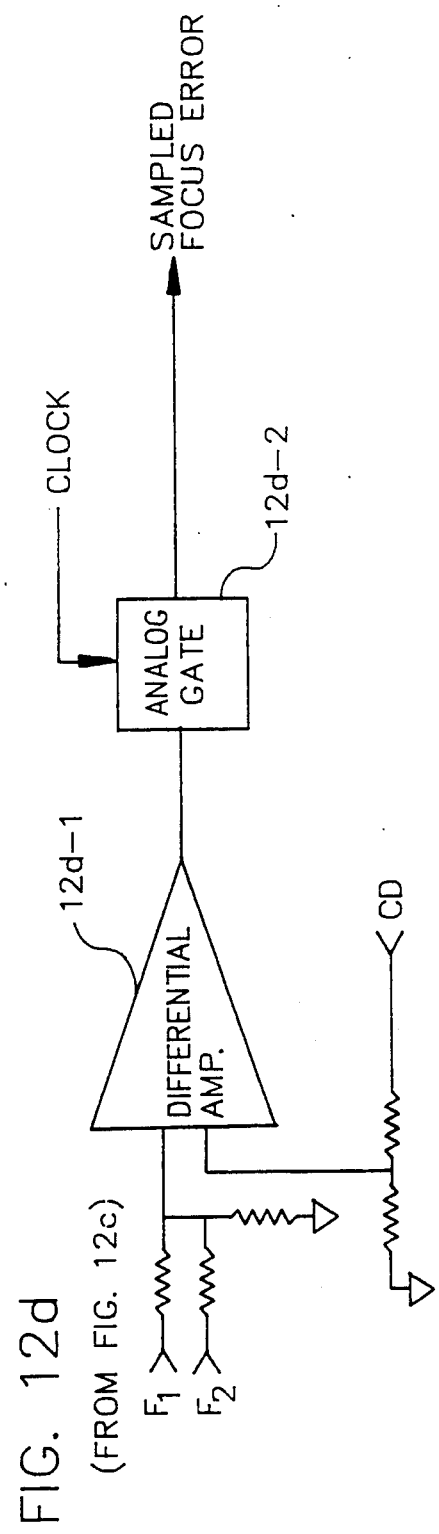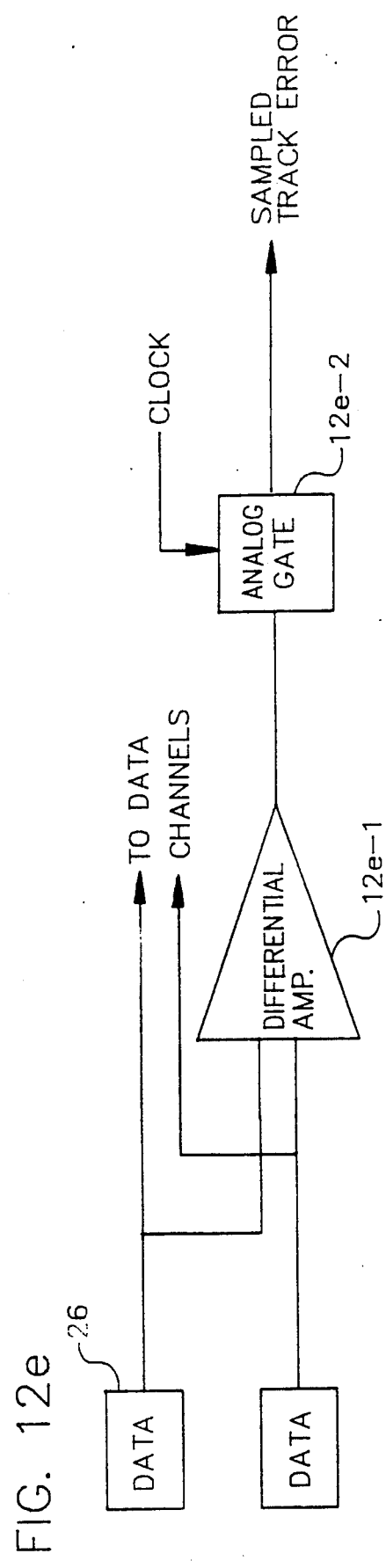
FIG. 12d (FROM FIG. 12c)
FIG. 12e

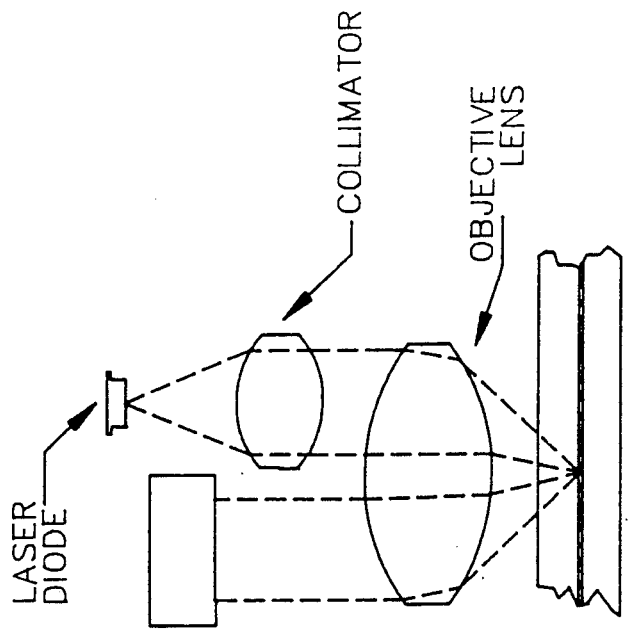
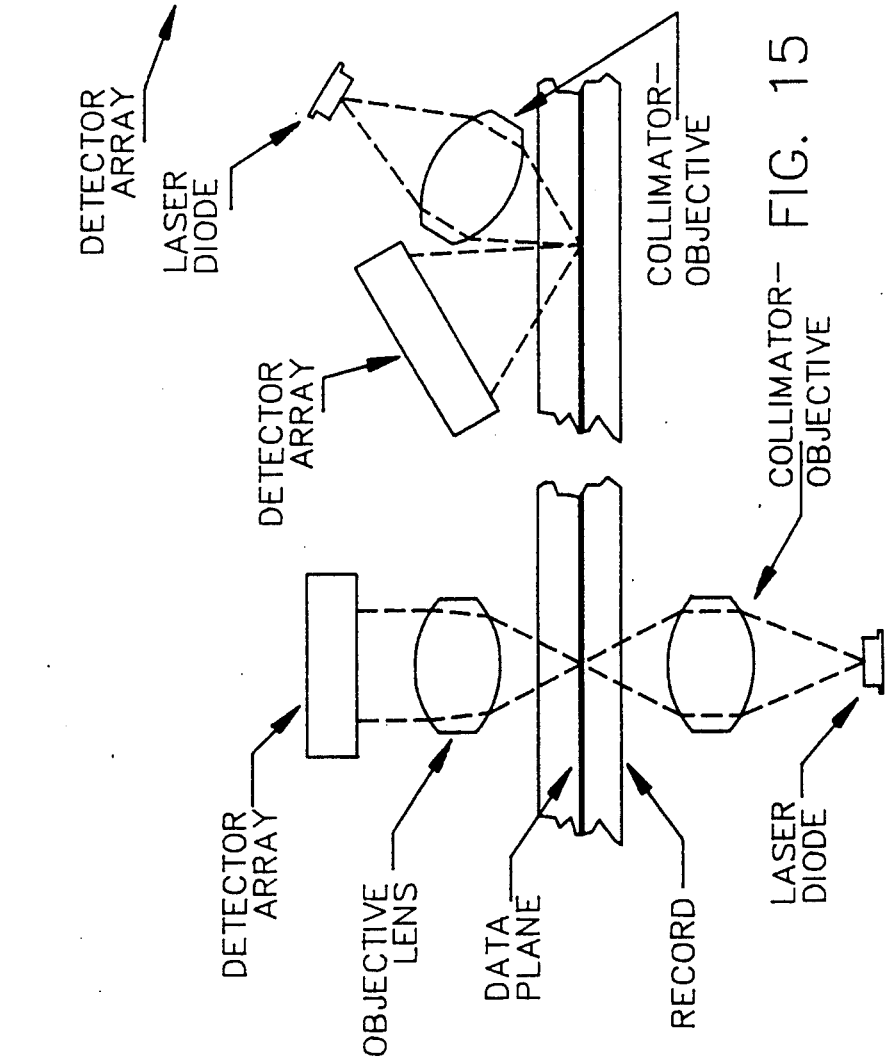
FIG. 16
FIG. 15
FIG. 14

OPTICAL RECORDING/REPRODUCING SYSTEM USING INTERFERENCE TECHNIQUES

BACKGROUND OF THE INVENTION

The subject matter of the invention relates to optical data storage in which information is recorded onto and retrieved from a record capable of storing the information in the form of optically imprintable markings and retrieving such information from these markings by optical devices.

Various forms of optical data storage are currently available for recording both digital and analog information For example, analog data is recorded on optical disks by encoding the data in the form of variable width pits or depressions in the record and then reading this information by electro-optical means.

Another example of existing optical data storage is provided by the popular "Compact Disc" technology in which music and other audio information is recorded onto small optical record discs that are capable of storing large amounts of prerecorded music and other audio tracks. This Compact Disc technology, made popular in the field of prerecorded music, is now being used to store computer data. Software programs and data can thus be stored on a physically small record in amounts many times greater than popular magnetic disc records. For example, a Compact Disc can store the equivalent amount of computer data that would require over one thousand "floppy" magnetic discs of the popular $5\frac{1}{4}''$ size used in personal computers Despite the impressive advances of optical data storage techniques, there are, nevertheless, limits to the amount of information that can be recorded on an optical record. Moreover, there are significant limitations in the low rate of data recording and data access available from existing optical storage techniques. Furthermore, advances are being made in magnetic recording technology and in other storage materials to increase their storage capacity, narrowing the net advantage of optical data storage systems.

As related background to the subject invention, the existing optical data storage techniques most typically store information in the form of a series of data bits in which each bit is represented on the record as a physical mark or transition from one physical mark to the next along the direction of scan. For example, data may be recorded as a series of pits spaced along a record track Each pit or transition between pit and surrounding land represents a single bit of data. In this prior type of optical storage, the data bit is encoded in the form of a physical mark on the record which can be read by optical means, such as by irradiating the object mark by a light source, usually from a semiconductor diode capable of emitting a small laser beam. Because each data bit requires a distinct mark, which we call an object mark, on the optical record, the amount of data that can be recorded is limited by existing means for forming the object mark and for sensing its presence or absence along the record track. In other words, each physical object mark on the record yields only one bit of data, and, of course, many hundreds of thousands of such data bits are required in order to store any significant amount of information.

Also, in regard to existing optical data storage systems, binary object marks on the record along the data track pose difficult practical problems of: tracking to insure proper alignment of the read/write optics with the data, focusing of the read/write optics to insure an adequate signal-to-noise ratio in the retrieved data, synchronizing the read electronics with recovered data bit signals, and compensation for the broad frequency band width of the detected data stream. These compensation or correction requirements for accurate tracking, focusing, synchronizing have led to the adoption of certain sophisticated bit/word encoding schemes, such as the well known 8 to 14 code. However, such encoding techniques reduce the amount of data that can be recorded over any given unit of length along the track, and limit the effective rate of data retrieval.

It is noted that some existing optical data storage systems use diffraction light patterns for tracking. However, it is important to distinguish the use of such diffraction light patterns for such a purpose, i.e., tracking, from the present invention's use of interference light patterns as described herein for actually encoding the basic information signal in a changeable interference pattern extracted from the record during read. Existing uses of diffraction patterns are limited to the formation of side lobe sensing windows located on opposite sides of a central read lobe and merely assist in maintaining the central read lobe on track center.

Also, the principle of the present invention is to be distinguished from certain holographic systems in which the optical interference pattern itself is recorded to enable reproduction of the holographic image.

By way of further background, reference is made to the following treatises dealing with optics and recording techniques relevant to an understanding of the present invention described herein:

General reference for single and multi-slit interference: *Fundamentals of Optics*, Jenkins and White, McGraw-Hill, 1950, Chapters 13, 15, 16, 17, and especially Sections 17.1, 17.2, and 17.3.

General reference for multi-element interference, the Fourier transform of them, and circular aperture formulas. *Fourier Optics: An Introduction*, E. G. Steward, Ellis Horwood Ltd., Publisher, Halsted Press/John Wiley & Sons, 1987, Chapters 2 and 4, and Appendix C.

*CD ROM The New Papyrus*, S. Lambert, S. Ropiequet, Eds., Microsoft Press, 1986.

*Principles of Optical Disc Systems*, G. Bouwhuis, J. Braat, A. Huijser, J. Pasman, G. van Rosmalen, K. Schouhamer Immink (all at Philips Research Laboratories, Eindhoven), Adam Hilger Ltd., 1985.

SUMMARY OF THE INVENTION

Therefore, it is an object of the present invention to provide an optical storage system for increasing the amount of data that can be recorded and retrieved from a given area of the optical storage medium, i.e., increasing storage density, increasing the data rate, and at the same time facilitating tracking, focusing and synchronization. The basic principle of the present invention is to encode the information that is to be recorded by forming related sets of variably spaced marks on the optical record. Each such set of such marks when illuminated with coherent light causes an optical interference pattern consisting of a distribution of amplitude maxima separated by amplitude nulls or minimas that change in accordance with the encoded information. As an example, two or more slits or holes may be formed as a set of marks in the record at each data location. A source of coherent light directed at this set of marks produces an optical interference pattern having the above characteristic maxima and minima. In accordance with the present invention, the information data, for example, $S_i$, which may be sampled data or a sampled analog signal, is encoded as a function $f(S_i)$ by variably controlling the separation between two or more marks of the set on the optical storage record. Thus, in the recording process, the set of physical marks, for example, two or more slits or holes, are controllably spaced so that during read the resulting optical interference pattern has detectable spacing between maxima, or minima, that varies with the information content of $S_i$. This pattern information is detectable as an output signal being a predetermined function g of the encoded information, i.e., $g(S_i)$.

The information signal $S_i$, when extracted from the function g, is essentially in analog form having a continuum of values. It ($S_i$) is thus capable of storing analog information, for example, of a value varying continuously from 0 to 1000. Alternatively, $S_i$ can represent 1000 digital values in discrete steps. Therefore each set of marks on the record track contains an order of magnitude or more information than in the single physical mark storing one binary data bit in existing optical storage systems. Although the process of the invention is basically analog, the data recorded and retrieved may itself be digital, including binary, by initially encoding the digital data into the form of an analog signal which is recorded. The retrieved analog signal is then discretely decoded back into digital at the output side of the read subsystem.

Also, it is important to note that the recording and retrieving process of the invention, although basically analog, has certain features and advantages of a digital recording operation. The data is recorded and retrieved by a set of marks on the optical image that are either present or absent, making error detection easier and more reliable. The integrity of the encoded information is contained in the interference pattern itself, which is determined by the location of the average centroid of the marks, not in the clarity or edge definition of the marks. This feature results in a system that enables record duplication using existing optical copying techniques to reproduce records with substantially 100% retention of signal-to-noise quality, much like that available in the reproduction of records recorded with digital processes.

In a preferred form of the invention, a set of three marks are formed on the record for each information storage location. The physical orientation and spacing of the three mark set is such as to produce an interference pattern similar to a two mark set, but with a somewhat sharper definitional pattern of maxima and minima. Furthermore, in a three mark set, the always present centermark facilitates the use of certain focusing, tracking and synchronization techniques described in greater detail hereinafter.

While the number of marks in each set is a minimum of two and, in the preferred embodiment three, it is recognized that more marks are required at each data location than the single mark associated with a single bit of information in the conventional optical storage systems. However, even though an extra one or two marks are required at each data location for the present invention, each set of marks will represent many, e.g., several hundred or more information values because of the ability to encode significantly more information values into the variably optical interference pattern than in the single data bit mark of conventional optical recording.

In the preferred embodiment of the invention, retrieval of the recorded information is achieved by illuminating each set of marks that are arranged, for example, transverse to the scan direction, e.g., along a record track, by a laser diode source and sensing the resulting optical interference pattern by an array of semiconductor photosensors. For example, in one preferred embodiment described herein, an array of photodiodes are located at known distances from the center line of the recorded track, as determined by a tracking subsystem. The movement of side maxima (side lobes) of the resulting optical interference pattern varies the output signal from the photodiode array and thus produces a varying output signal $g(S_i)$ representing the previously recorded information. Furthermore, in this preferred embodiment, the data is recorded serially in a spiral (or concentric) track on disc, as known per se, but unique to the present invention the data consists of the sets of marks that have variable information encoding spacing transverse to the track.

Furthermore, in the preferred embodiment, each record location will contain at least one mark for synchronization, focus and/or tracking. If no data is to be recorded at a particular location, then a single mark is made and the resulting read process produces a single central maxima which is readily detected Since the detector system will not sense any side maximas (i.e., side lobes) when only the single mark is made, the system will recognize this reproduction signal as not containing any information data and that, in turn, facilitates tracking, focusing and/or synchronization. The central maxima also provides for continuous calibration of intensity and, as a reference for the center of the track relative to which a measurement is made of the variable displacement of the side maxima (side lobes).

As a further advantage provided by the above summarized invention, there is no need to embed or record a word sync as part of the data as in the case of many conventional optical systems. Each set of marks encoding the information in the present invention can represent, itself, a multi-bit word in the form of an analog value having a digital conversion to a multi-bit value. That multi-bit word or multiple value data set is clocked as a whole at the data location by the presence of the central light maxima. Furthermore, the accuracy of reading the information is very high compared to conventional optical storage systems. Since the output information during read provides a pair of first order maxima, each pair being an encoded representation of the information signal, two independent measurements (one for each side maxima) can be made of the output data value $S_i$. The accuracy of the readout is not as dependent on precise tracking as in conventional optical systems, as long as all marks of a given set are illuminated by the read beam. Accuracy of the readout does not depend on the size of the marks or their edge definition, only on their relative positions that determine the optical interference pattern. A missing mark from a set, for example, one out of two marks, will cause an error; however, ordinary digital error detection correction techniques can be used in such event in the same way as existing error detection systems.

BRIEF DESCRIPTION OF THE DRAWINGS

These and further features, objects and advantages of the invention will become apparent to those skilled in the art from the following detailed description and appended drawings.

FIG. 1 is a generalized functional block diagram of the writing (recording) process in accordance with the optical data storage system of the present invention.

FIG. 2 is another generalized functional block diagram of the reading (retrieval) operation of an optical record encoded in accordance with the system of the present invention.

FIG. 11 is a simplified logic circuit showing an alternative signal processing scheme for retrieving the encoded data from the variable interference pattern of FIG. 9.

FIGS. 12c, 12d and 12e show in greater detail certain of the circuit components used in the synchronization, tracking and focusing controls for the read electronics of FIG. 12b.

FIGS. 14, 15 and 16 show various different and alternative configurations to the read optics shown in FIG. 8b.

DETAILED DESCRIPTION OF PREFERRED EMBODIMENTS

Figure 3:
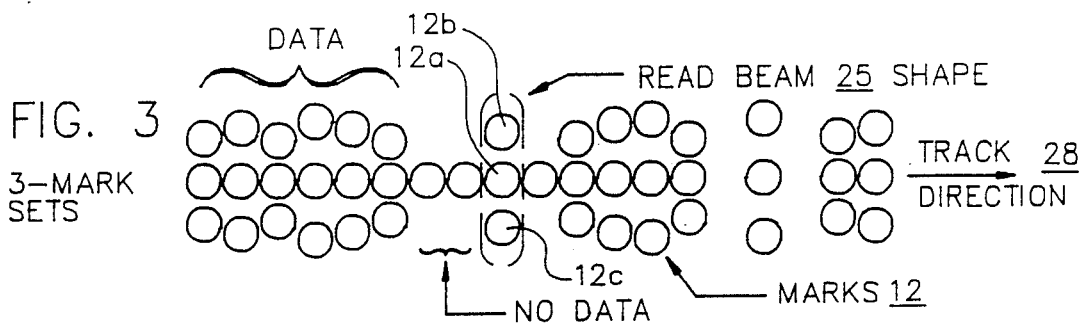
FIG. 3 is a schematic diagram of an exemplary track of recorded data using a three mark data set in accordance with the preferred embodiment of the invention.

The principles of the recording and reading apparatus and methods of the invention are illustrated by the functional block diagrams in FIGS. 1 and 2 in which a signal $S_i$ containing information to be recorded and later retreived is encoded onto an optical data disc 10 in the form of sets of marks 12 that develop an optical interference pattern 14 (see FIG. 2) when illuminated during a read operation by a coherent light source.

While a variety of recording subsystems may be used, for which specific examples are described below, FIG. 1 shows in generalized form the write optics 15 in which the input signal information $S_i$ is applied to an electro-optical beam splitter and deflector 16 to receive a source of recording light 18, preferably from a coherent source such as a laser diode, and operating on the source light beam to divide it into at least two and preferably three distinct light beams 20. The angular separation of the beams 20 is a function of the input signal information $S_i$ so that in effect the beam splitting operation is modulated by the instantaneous value of the information stream. Arranged to be illuminated by the split recording beams 20 is the optical record 10. The variable split recording beams 20 produce a set of marks 12 that are spaced by a function $f(S_i)$. The material forming optical record 10 is any of a variety of known materials, such as a synthetic base provided with a surface coating of photoresist, that are known per se to form physical marks, such as alternating reflective and non-reflective spots, when exposed to light and then developed by chemical processes. Although it is known to record information by deflecting optical beams in response to the information signal to be recorded, the present invention departs from conventional optical storage technology by encoding the input information in sets of marks 12 that are later read as a unified set.

The recorded input information is stored as a variable dimension $g(S_i)$ of an optical interference pattern 14 produced during the read operation as shown on FIG. 2. More particularly, the optical interference pattern 14 contains a function of the input signal information in the form of the quantity $g(S_i)$ in the separation between certain maxima or lobes of pattern 14. Here the recorded information is stored as a function of the variable separation between a center maxima 14a and one or both of the first order side maxima 14b and 14c of interference pattern 14. To develop interference pattern 14 from each set of marks 12 on record 10, the read optics 23 includes a coherent source of reading light 24 which produces a read beam 25 that illuminates each set of marks 12 along a track (usually the track will be normal to the axis of the multiple marks 12) so that the waves of coherent light are constructively and destructively combined in a space adjacent record 10, in this instance on the opposite side of record 10 from source 24. The result is the optical interference pattern 14 which may be detected at selected planes parallel to record 10 by a photodiode detector array 26. Array 26 develops output signal information that represents the function g of the recorded and retrieved input signal information $S_i$ by sensing the variable separation of the maxima lobes 14a, 14b and, if desired, 14c.

It is observed that the set of marks 12 in FIGS. 1 and 2 has the capability of storing an infinite continuum of information values as a function of the variable spacing between the interference pattern maxima 14a, 14b and 14c. In most conventional optical storage systems, the information content stored on an optical record is in the form of a single mark representing a single bit of binary. In other words, the single mark of conventional storage records is either present or not present and represents a binary 1 or 0 value. A large number of such individual marks are required to form multi-bit words and many words are then in turn combined to form useful data streams. In contrast, the present invention as illustrated in FIGS. 1 and 2 records a set of marks 12, in which a minimum of two marks are required and preferably three are used as illustrated here, to form an analog recording of the information content by the variable lobe or maxima spacing of the resulting read interference pattern 14. For example, given existing electro-optical equipment, each set of marks 12 may encode a range of up to 1000 values with only three discrete marks 12 at each data location on record 10. In practice, a track of information will be recorded as best seen in FIGS. 3 and 4 consisting of sets of marks, such as micron sized holes in the optical record, with each set of marks arranged transverse to the axis of the track 28.

FIG. 3 shows the preferred three mark set 12. A plurality of mark sets are formed along track 28, with each set disposed crosswise of the track so that a center mark 12a is always present at the middle of the track for use in tracking, focusing and/or synchronizing.

Figure 4:
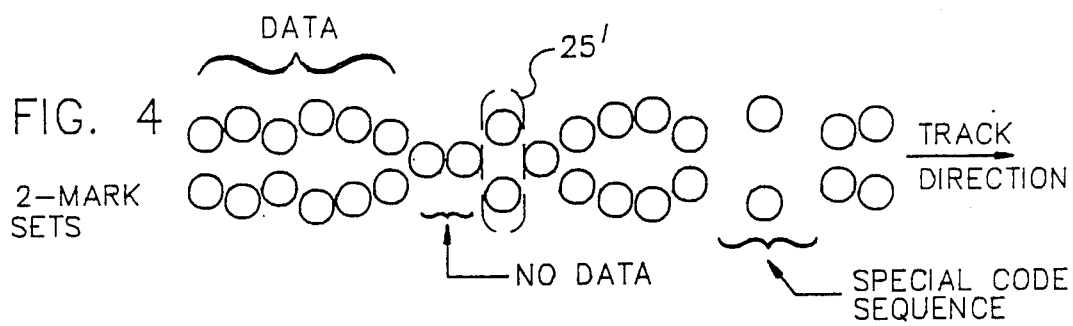
FIG. 4 is a schematic diagram similar to FIG. 3 but showing the information recorded using a two mark data set in which the center mark of each data set is absent.

FIG. 4 shows an alternative encoding record using the minimum of two marks per set 12'. In the alternative embodiment illustrated in FIG. 4, the center mark is omitted whenever data is present.

Referring again to FIGS. 1 and 2, it will be observed that the physical spacing of marks 12 at each data or value set on record 10 is an encoded form of the input information $S_i$ recorded as a predetermined function of $S_i$. While it might be theoretically possible to retrieve the recorded information directly by conventional forms of magnifying and measuring the physical separation of marks 12 from record 10, the present invention is unique in that the marks 12 are recorded at a very high density, and thus with minute separation in a range of 2 to 4 times the wavelength λ of the read light beam. For example, using an aluminum gallium arsenide laser diode, having a λ=0.78 microns, the marks 12 of each set have a separation of about 1.56 to 6.24 microns. Retrieving this information from the record using conventional optics and electro-optics is difficult at best, and undesirable because of the requirement of very expensive and sophisticated read optics. Because of the high density recording of marks 12, the spacing is on the same order of magnitude as the wavelength of the light used for reading source 24. As such, conventional imaging processes do not provide optimum resolution of the marks 12 when imaged on a photodetector or other light sensing detectors.

In the present invention, the minute spacing between the multiple marks 12 is used to advantage by forming a light interference pattern which uniquely retrieves the spacing information from the multiple marks of each record set 12 in the form of the interference pattern maximas and minimas. Three marks, such as a three slit set, produce a strong center maxima 14a and two relatively strong first order maximas 14b and 14c at equidistant opposite sides of the center maxima. By intercepting the interference pattern at a suitable plane offset from record 10, the spacing between these maxima is translated into an information output signal. The signal may be derived from the variable spacing between a center lobe 14a and one of the first order side lobes or maximas 14b as illustrated in FIG. 2. Alternatively, the information content may be derived by the spacing of two $g(S_i)$ representing the overall separation between the first order maximas, or redundant measurements can be taken for the single value function $g(S_i)$ measured from the center maxima to each first order side maxima and an average taken of the two readings.

Figure 5:
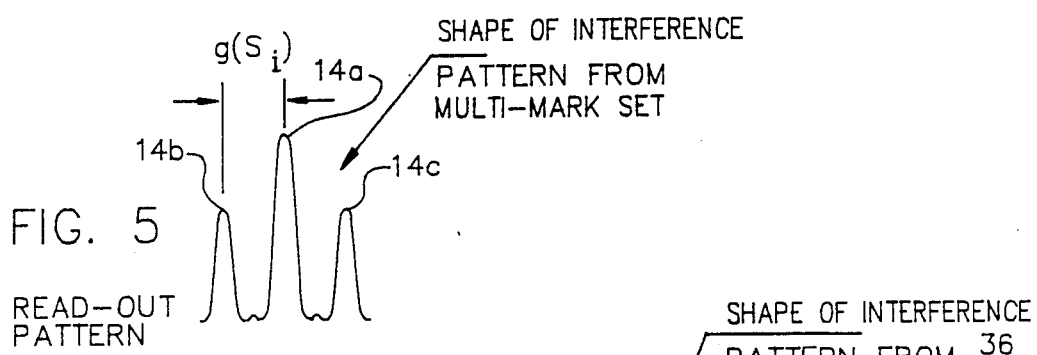
FIG. 5 is a waveform diagram of the optical interference pattern showing the encoding of the information signal $S_i$ as a variable spacing between the first order maxima of the interference pattern.

The exemplary light interference readout patttern is more specifically shown in FIG. 5. The shape of this pattern includes a large center maxima 14a and a pair of first order maxima 14b and 14c spaced symmetrically and at the same function distance $g(S_i)$ on opposite sides of the center maxima 14a. The relative amplitude of the first order side maxima 14b and 14c are roughly $\frac{1}{2}$ to $\frac{2}{3}$ of the center maxima 14a in the case of a three mark set. There are, of course, additional maxima that extend at greater distances from the center lobe on both sides and with diminishing amplitude; however, the useful side lobes for most practical purposes are the first order maximas 14b and 14c. In the alternative system using a two mark set for each data location, the side maxima are less sharp, although still useable.

The detailed shape of the interference pattern is determined by three effects: the effect of a single aperture, the effect of several apertures in concert, and a cosine term for the drop-off in intensity with angle. The equation describing the pattern therefore has three terms.

The first term, the single aperture term, is usually derived from the assumption of a single slit of infinite extent and a width of a few to many wavelengths. See Eqn. 1 from, for example, E. G. Steward, *Fourier Optics: An Introduction*, Halsted Press, 1987, p. 37, or from F. A. Jenkins and H. E. White, *Fundamentals of Optics*, second ed., McGraw-Hill, 1950, p. 282.

Figure 6:
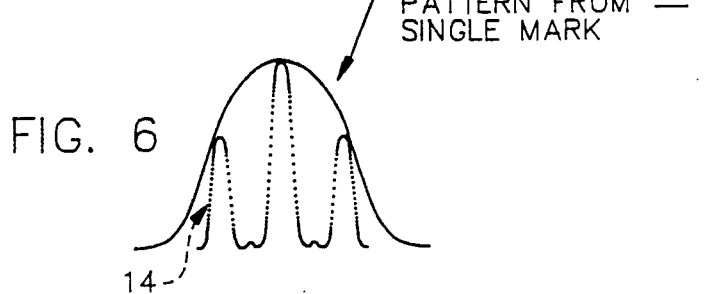
FIG. 6 is another waveform diagram showing a comparison of the wider envelope (solid line waveform) corresponding to the illumination of a single spot or mark (i.e., no data recorded) and, for comparison, the interference pattern (dotted line waveform) that results from reading a multiple mark data set.

Whenever the read beam 25 scans across a single mark such as the no data center marks 12a in FIG. 3, the resulting light output sensed by the detector array is a single, relatively wide waveform (solid line in FIG. 6) without the intervening nulls (signal minima) that are characteristic of the interference pattern 14 (shown for comparison by dotted lines in FIG. 6). The shape of the wider output waveform without alternating maxima and minima that results from scanning across a single mark is used to advantage in the preferred embodiment of the present invention for tracking and focusing control as described herein in connection with FIGS. 9 and 12B. It is observed in FIG. 6 that the solid line representing the waveform output from a single mark read is shown in superposition with the dotted line interference pattern 14 for comparison only and these two patterns did not normally exist at the same time, rather the patterns would alternate between the solid line wave form representing a read scan across a single mark followed by a read scan of a multiple mark set producing interference pattern 14. Thus, as described more fully hereinafter, detectors located to read the centermost portion of the output waveform as well as locations on either side of such waveform enable the control electronics to detect a transition between the wider solid line waveform 36 in FIG. 6 and the multi-set interference pattern waveform 14. By processing the resulting detector output signals, tracking, synchronizing and/or focusing control signals are developed.

The intensity of the output light in waveform patterns 14 and 36 is a function of the size of the marks. For example, if the marks take the form of apertures in a transmissive read system, the strength of the output light transmitted through an aperture increases with its size. However, the encoded signal information in the function $g(S_i)$ will be independent of the size of the marks and will only vary with the spacing between the centers of each mark in the set. Furthermore, the edge definition of the marks will not significantly influence the encoded spacing $g(S_i)$ so that the encoded information and its retrieval is not significantly degraded by the sharpness of the marks formed on the record.

DISC RECORD DRIVE

Figure 7:
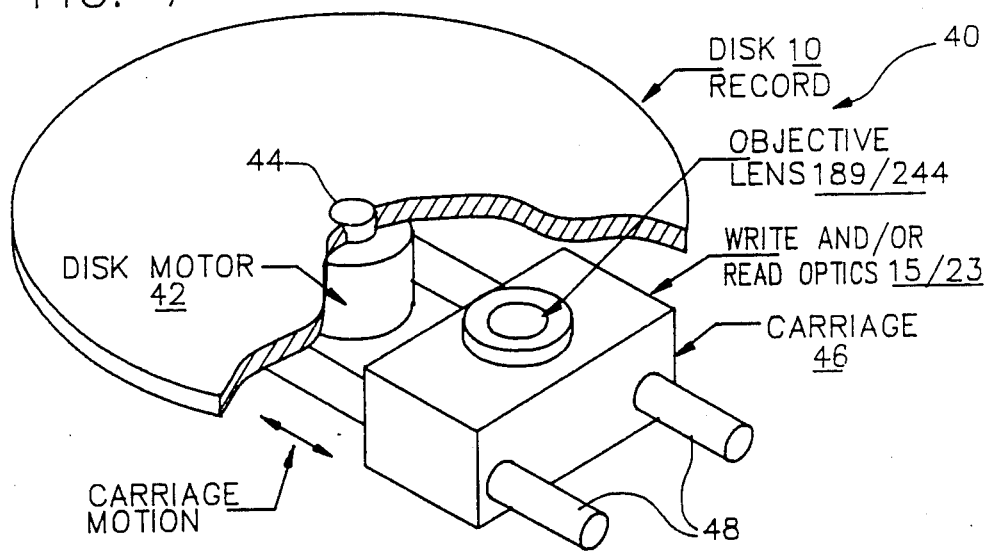
FIG. 7 is an isometric view of a preferred form of the drive mechanism used in the present invention in which the recorded information is formatted as a continuous spiral track on an optical disc record and in which the read optics retrieve the optical interference pattern by means of illumination of and reflection from one side of the record disc.

In the preferred inplementation of the present invention and by way of illustrating the principles of the invention, data is recorded serially in a spiral track on an optical disc providing record 10 as shown in FIG. 7. The drive 40 for disc record 10 includes the customary disc motor 42 and spindle 44 for spinning record 10 at a controlled angular velocity. A carriage 46 slidably mounted on carriage tracks 48 movably supports the read and/or write optics 15/23 which include an objective lens arranged close to but not in contact with a surface of disc record 10. Optics 15/23 with its objective lens thus moves along a radial path with respect to the axis of disc record 10 writing onto or reading from a spiral track, or a series of concentric ring tracks, on disc record 10 as it is spun by motor 42. Alternative drives with different recording formats are contemplated and are described later in the description of alternative embodiments.

The recording on record 10 can take various forms; however, in the preferred embodiment the data is encoded in the form of reflective and non-reflective spots on one or both surfaces of the disc. As described below in connection with FIGS. 8A and 12A, the recording operation will normally involve making a master record by exposing a photoresist coating on a glass master disc with the writing beams. After writing the master disc, it is developed by etching away the photoresist to leave minute regions along the track where the surface is reflective. As exemplary dimensions, the width of a three mark data track, as it is illustrated in FIG. 3, would be about 4 microns. Each spot or mark such as marks 12a, 12b, and 12c forming a set would be on the order of one micron across. The spacing between marks would be on the order of ½ to 1 micron. The photoresist mastering process is known per se in recording data onto Compact Discs and the related laser discs. After mastering, there may be one or more intervening submasters made called "stampers" that are in turn used to form useable copies. The copies may be made from synthetic semi-rigid materials such as polycarbonate, which is a known transparent plastic used for making Compact Disc copies used in consumer equipment.

WRITE OPTICS

Drive 40, as shown in FIG. 7, may include write optics 15 with or without read optics 23 on the same carriage 46. Preferably, the writing operation will be performed by relatively high-precision, non-consumer equipment in which the tolerances of the components and the servo controls are precise for mastering. Then copies of the record can be made from the master or from "stampers" and played back on less expensive, lower tolerance drives having only read optics 23 mounted in carriage 46. Nevertheless, both read and write optics may be mounted in the same carriage in a side by side arrangement or with shared optics if desired.

Figure 8A:
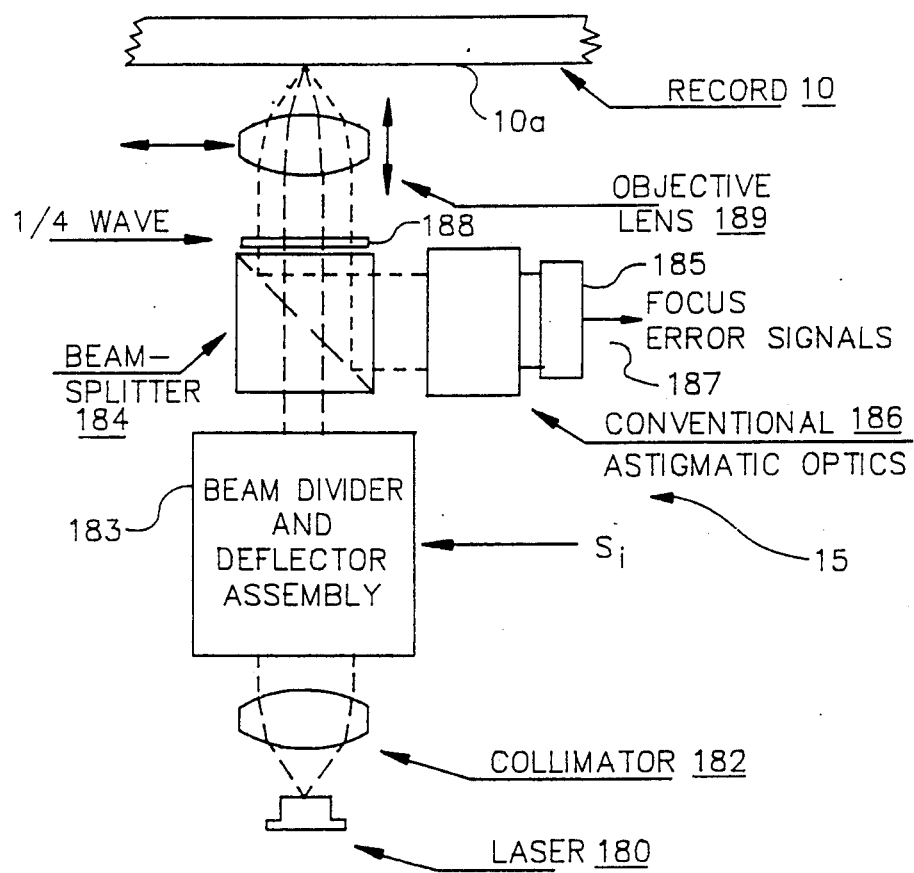
FIG. 8a is a schematic of the write optics suitable for recording onto an optical disc used in the drive of FIG. 7.

Now with specific reference to FIG. 8A, the write optics 18 includes a laser diode 180 producing a polarized light beam that is then shaped by collimator 182 and passed through a beam divider and deflector assembly 183 where the light source is divided and angularly modulated in response to the data or information signal source $S_i$. The divided and modulated beams are then passed through a polarized beam splitter 184, ¼ wave plate 188, and objective lens 189. Reflections from the write beam are deflected by splitter 184 to focus module 185 including conventional astigmatic optics 186. Module 185 produces feedback control signals, i.e., error signals, at output 187 that are applied to focus control electronics shown in FIG. 12a and described in more detail below.

The write light beams impingent on surface 10a of record 10 appear as beams 20 having variable angular divergence or convergence as shown in the recording process of FIG. 1. The objective lens 189 is movably mounted by conventional means, not separately shown, for both to and from displacement relative to record surface 10a for focus and in a plane parallel to surface 10a for tracking as indicated by the double headed arrows adjacent objective lens 189.

Figure 17:
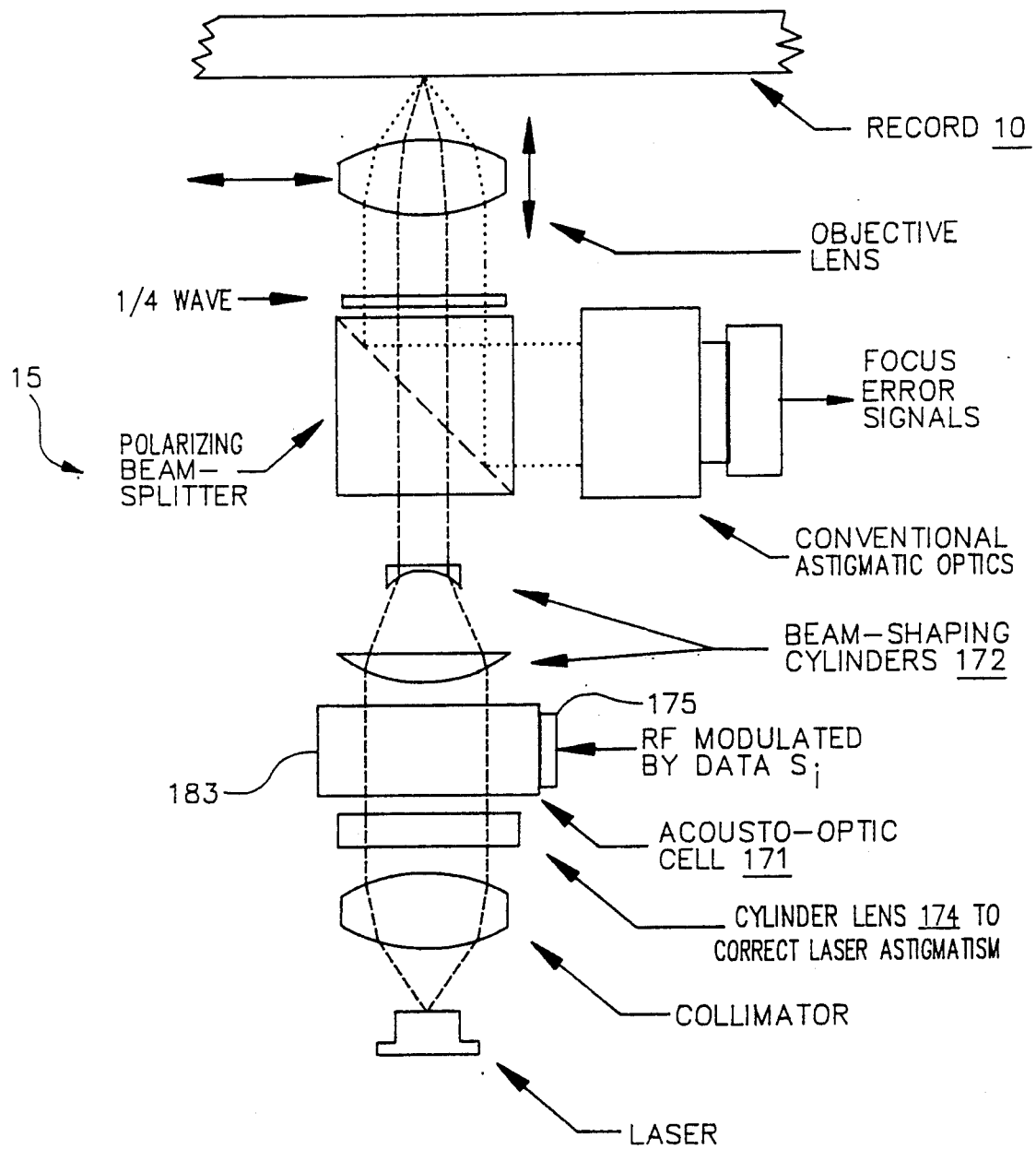
FIGS. 17, 18 and 19 illustrate variations for the write optics used in FIG. 8a for encoding and recording the information content onto an optical disc.

The beam divider and deflector assembly 183 can take various forms as described below herein in connection with FIGS. 17–21; however, it is preferred that an acousto-optic deflector be used as shown in FIG. 17 and described herein in detail in connection with that figure.

In the operation of recording optics 18, three output beams are generated when forming the three mark set 12 according to the preferred embodiment of FIG. 3, described above. As previously mentioned, the recording system is basically analog in that the spacing of the physical marks on record 10 are continuously variable in a range of variable spacing crosswise of the record track.

In the preferred embodiment, the information signal is encoded only in the variable spacing of marks within a set of such marks arranged transverse of the record track 28 as best shown in FIG. 3, above. However, alternative embodiments are discussed hereinafter in which additional information is stored by encoding data in variable spacing along the track as well as transverse to the track.

After mastering a record and making useable copies, it is preferable that the record surface containing recording be protected by a relatively thick transparent coating material to keep dust, scratches, etc., from degrading the read operation. Such a coating is known per se and is used on conventional Compact Discs in the form of a 1.2 mm layer of polycarbonate. For the write operation, the optical system must be of high quality with a relatively large NA (numerical aperture). This is because the system must make spots (marks) on the record that are on the order of one micron or so in diameter. Objective lens with an NA of 0.5 is preferred for recording marks of one micron.

Figure 12A:
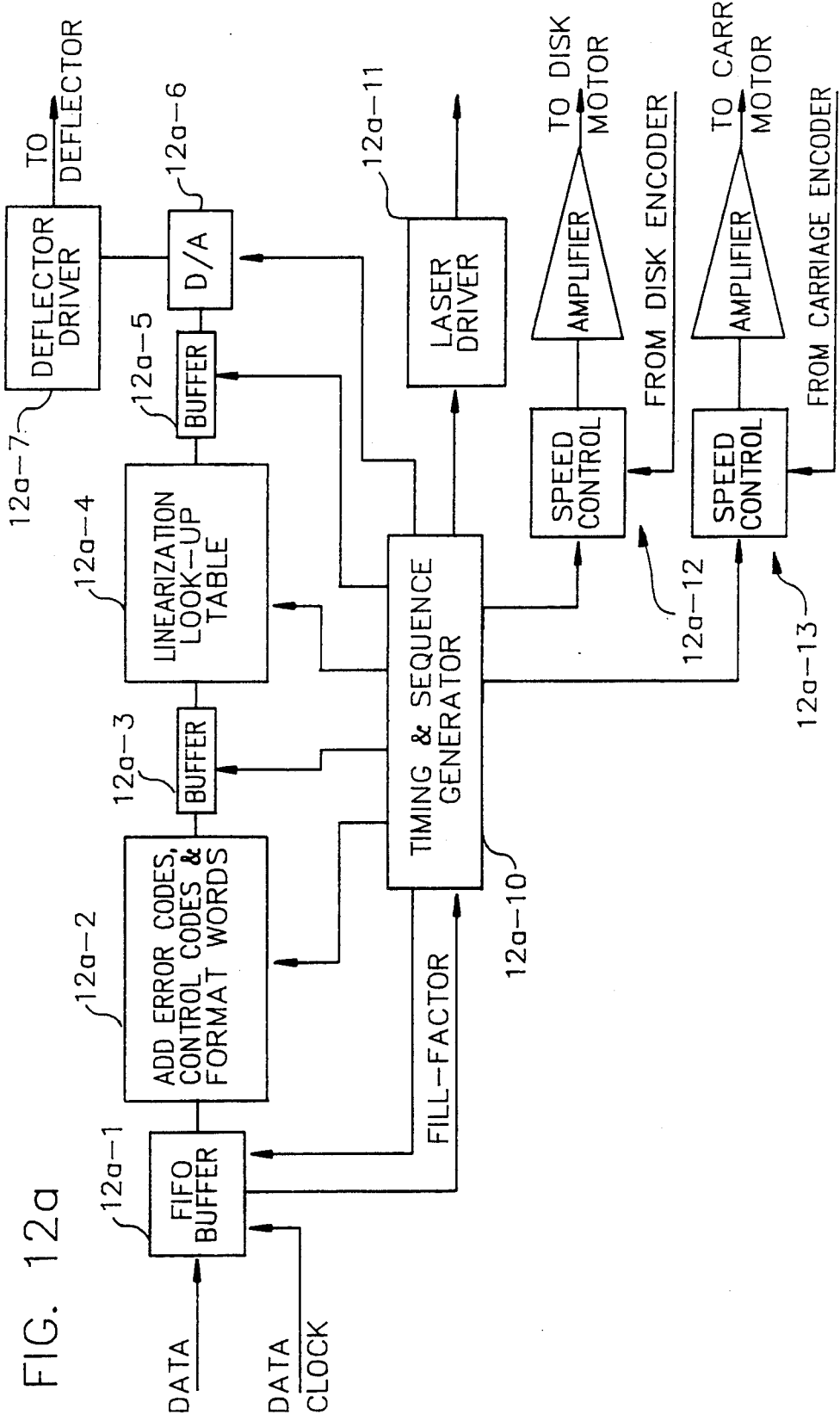
FIG. 12a is a detailed block diagram illustrating a suitable control subsystem for governing the operation of the write optics of FIG. 8a during encoding of data and recording of the optical disc.

During write operation, drive 40 and write optics 18 are governed by the write control subsystem shown in FIG. 12a. Tracking for write operations in the preferred embodiment uses conventional control technology. While a number of alternatives exist, the preferred embodiment as shown in FIG. 12a has an FIFO buffer 12a-1 into which data is entered at a clock rate, combined with error codes, control codes, and formatted in processor 12a-2, rebuffered at 12a-3, passed through a linearization look-up table 12a-4, buffered again at 12a-5, and then applied through a digital to analog converter 12a-6 to the deflector driver 12a-7 that controls the write optics shown as beam divider and deflector assembly 183 of FIG. 8a. These components are timed and sequenced in a conventional fashion by a timing and sequence generator 12a-10 which is also coupled to the laser diode driver 12a-11 and to the disc drive motor control 12a-12 and carriage drive control 12a-13. The controls of FIG. 12a are essentially the same as used for recording Compact Disc masters. Alternative recording optics and associated controls are mentioned below in the section dealing with alternative embodiments.

In forming the multiple mark sets as they are shown in FIG. 3 by means of the write optics 18, it is preferable that each set of marks 12 nearly touch the adjacent sets. This will maximize density and still enable adequate signal-to-noise ratio during read. As described below in connection with the read operation, the close spacing of the mark sets along the track 28 means that the read beam is preferably oval in shape with the major axis oriented crosswise of the track as depicted by the dotted line oval of read beam 25 in FIG. 3.

READ OPTICS

Figure 8B:
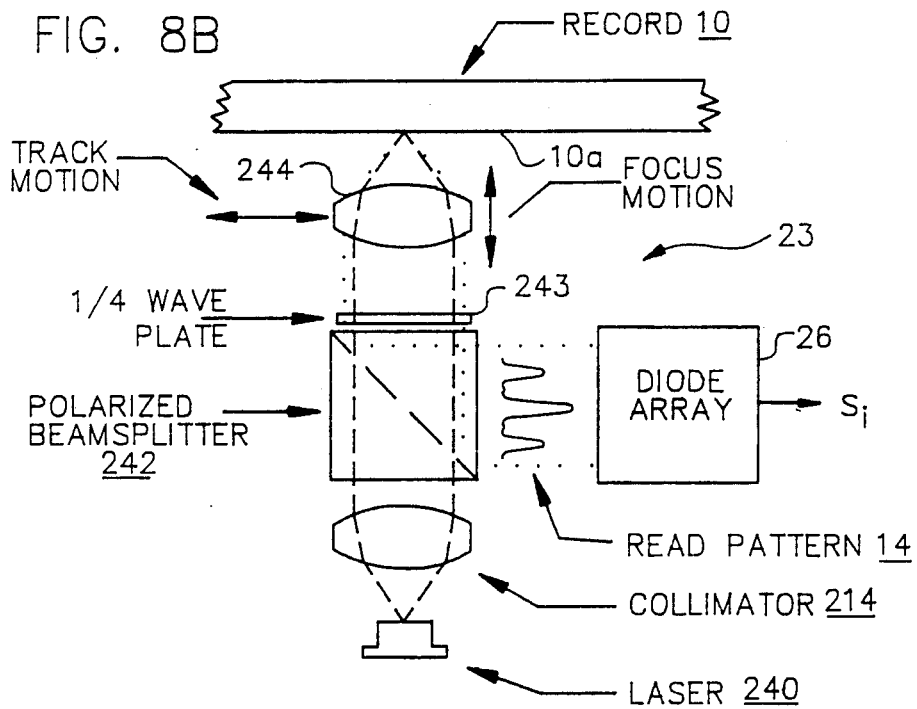
FIG. 8b is another schematic illustrating the read optics used in the drive of FIG. 7 for reading a prerecorded track on the optical disc.

A preferred implementation of read optics 23 is shown in FIG. 8b. A laser diode 240, which for example, may be provided by an aluminum gallium arsenide diode, emits coherent light of wavelength on the same order of magnitude as the dimensions of marks 12 on record 10. The coherent light is shaped by collimator 241 and passed through a polarizing beam splitter 242, a one quarter wave plate 243, and a movably mounted objective lens 244 that focuses the beam on record 10. As mentioned, it is desirable that the read beam be of generally oval shape arranged with the major axis crosswise to track 28 as shown in FIG. 3 and this requirement is readily met by most laser diodes because they inherently produce an oval beam. Reflections from the marks on record 10 are returned through objective lens 244 back to the polarizing beam splitter that now reflects pattern 14 on the diagonal. Photodiode detector array 26 is arranged to intercept the reflected output read pattern which contains the multiple lobes or maxima 14a, 14b and 14c as shown in FIG. 5.

The quarter wave plate 243 is known per se to prevent reflections from the optics and/or record 10 from getting back into the laser diode and interfering with its operation. The plate 243 also holds losses in beam splitter 242 to a negligible amount.

Figure 9:
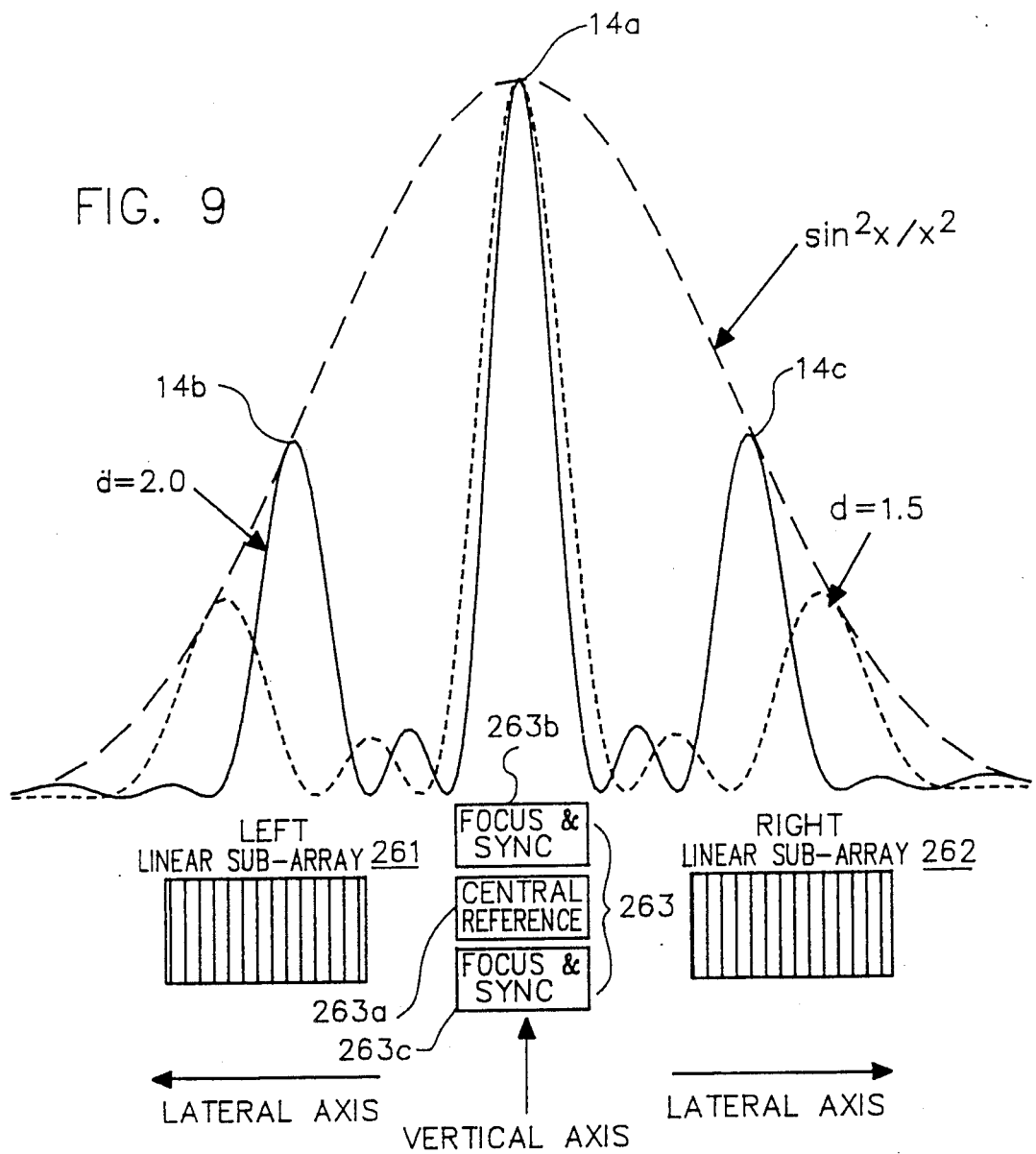
FIG. 9 is a diagram showing a suitable arrangement of the diode detector arrays disposed relative to an information encoded interference pattern that results from illuminating a multiple mark data set by means of the read optics shown in FIG. 8b in the drive of FIG. 7.

Diode array 26 may take various forms as described in different alternatives below; however, in the preferred embodiment the diodes are arranged as shown in FIG. 9 relative to the interference pattern 14 in groups consisting of a left linear array 261, a right linear array 262 and a group of diodes 263 arrayed along the track which will be called the vertical axis or vertical array. In particular, detectors 263 include a central reference detector 263a and a set of focus and sync detectors 263b and 263c arranged along the vertical axis above and below the central reference detector 263a. These detector diodes 263 respond to variations in the light reflection that occurs along the track as relative movement occurs between the read beam 25, as shown in FIG. 3, and the track, from one set of marks 12 to the next. The resulting output signals from these detectors are processed as described more fully below in connection with FIG. 12B to control the tracking, focusing and synchronizing of the read optics 26.

The left and right linear subarrays 261 and 262 include a plurality of juxtaposed diodes of sufficient number and arrangement to detect the range of lateral shifting of each side lobe or maxima 14a and 14b of the read pattern. The position of each lobe or maxima 14a and 14b is determined by sensing those diodes which are illuminated above a detection threshold and by measuring the ratio of intensity of diode pairs that straddle a particular lobe. The detection is thus partly digital in the sense that only certain discrete diodes are illuminated above the sensing threshold and is also partially analog in that the ratio of the diode signal strength measures position of the side maxima 14a and 14b.

The encoded signal data $S_i$ is extracted from the record by sensing the outputs from either or both of the left subarray 261 and/or the right subarray 262 which are at a known distance from the center of the track and hence at the center lobe or maxima 14a of the interference pattern. The dimension of each detector window in subarrays 261 and 262 is substantially smaller, in the direction of lobe movement, compared to the width of the lobe itself, i.e., lobe maxima 14b or lobe maxima 14c. On the other hand, in order to collect as much light as possible, each of the elements of subarrays 261 and 262 is much longer along the track direction than it is wide transverse to the track. While other configurations such as square or cylindrical lenses could be added to collect and focus light on the detector elements, the general geometry of elements of subarrays 261 and 262 of FIG. 9 is suitable. The detectors are preferably charge coupled devices and are accompanied by a transfer and shift register logic circuit such as shown in FIGS. 10 or 11 for extracting the signal data representing lobe movement from the read light pattern.

Figure 10:
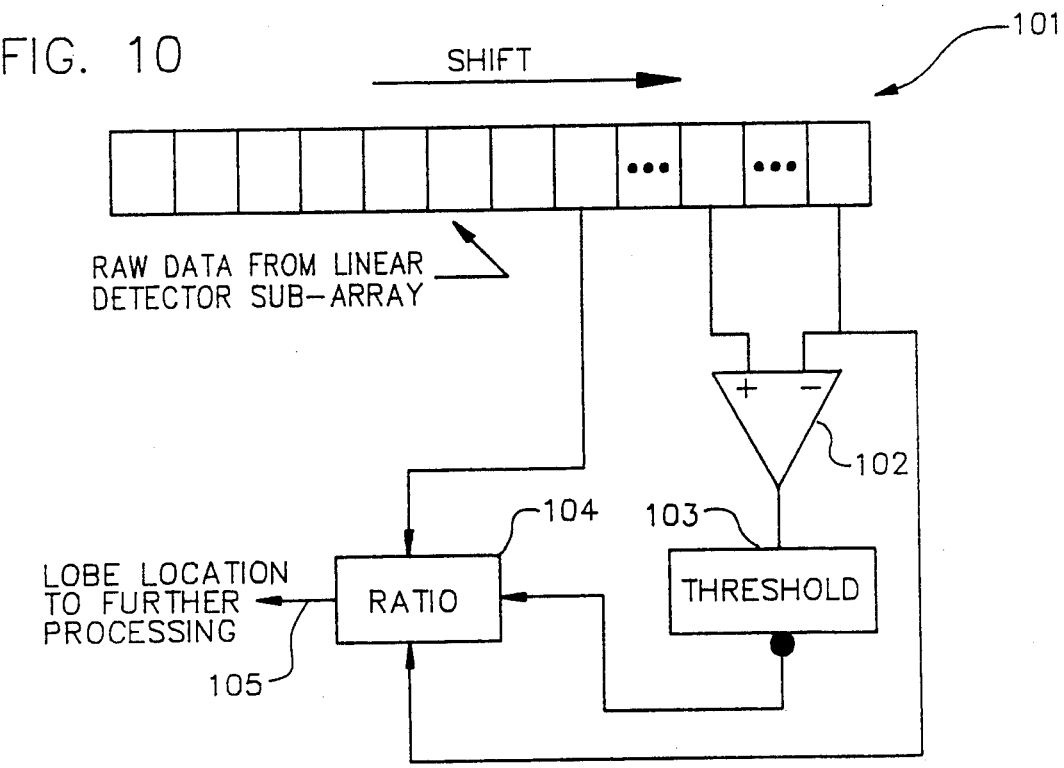
FIG. 10 is a logic circuit used to retrieve the lobe position information encoded into the light interference pattern shown in FIG. 9 by means of the diode array of the read optics shown in FIG. 8b.

The position of the side lobe (or lobes) is translated into an analog signal by a sensing control circuit such as shown in FIG. 10, including shift register 101, comparator 102, threshold detector 103, ratio circuit 104 and an output 105. Shift register 101 stores the positional information representing those particular diode elements of sub-arrays 261, 262 that have been illuminated with a side maxima 14b or 14c. The comparator 102 has inputs coupled to a certain spaced pair of elements of register 101 and an output connected through a threshold detector 103 to an enable input of ratio taking circuit 104 so that a raising signal level in shift register 101 elements, representing the raising edge of a detected side lobe, triggers threshold detector 103 and hence ratio taking circuit 104. The inputs to circuit 104 are connected to spaced elements of register 101 selected to span the anticipated width of the side maxima. As a result, ratio taking circuit 104 is tripped on a raising leading edge of a side maxima and the ratio output signal at 105 is a measure of the center point, i.e., peak, of the maxima (lobe).

Alternatively, a circuit such as shown in FIG. 11 may be used for extracting the read data in which a parallel transfer occurs between the signal outputs from the diode elements of subarrays 261 and 262 into register 111. A bank of comparators 112 define the point at which the signal output from the detector array element starts to decrease, i.e., the peak of the lobe of maxima 14b or 14c. A row of AND gates 113 blocks the output of any downstream comparator 112 corresponding to an array element illuminated beyond the peak of the side lobe. The result is a multibit word at the combined outputs of AND gates 113 that is fed to a decode logic 114 which decodes the position word and produces a corresponding binary output representing the location of the peak of the side lobe 14b or 14c.

SYNCHRONIZATION, FOCUS, AND TRACKING DURING READ

Figure 12B:
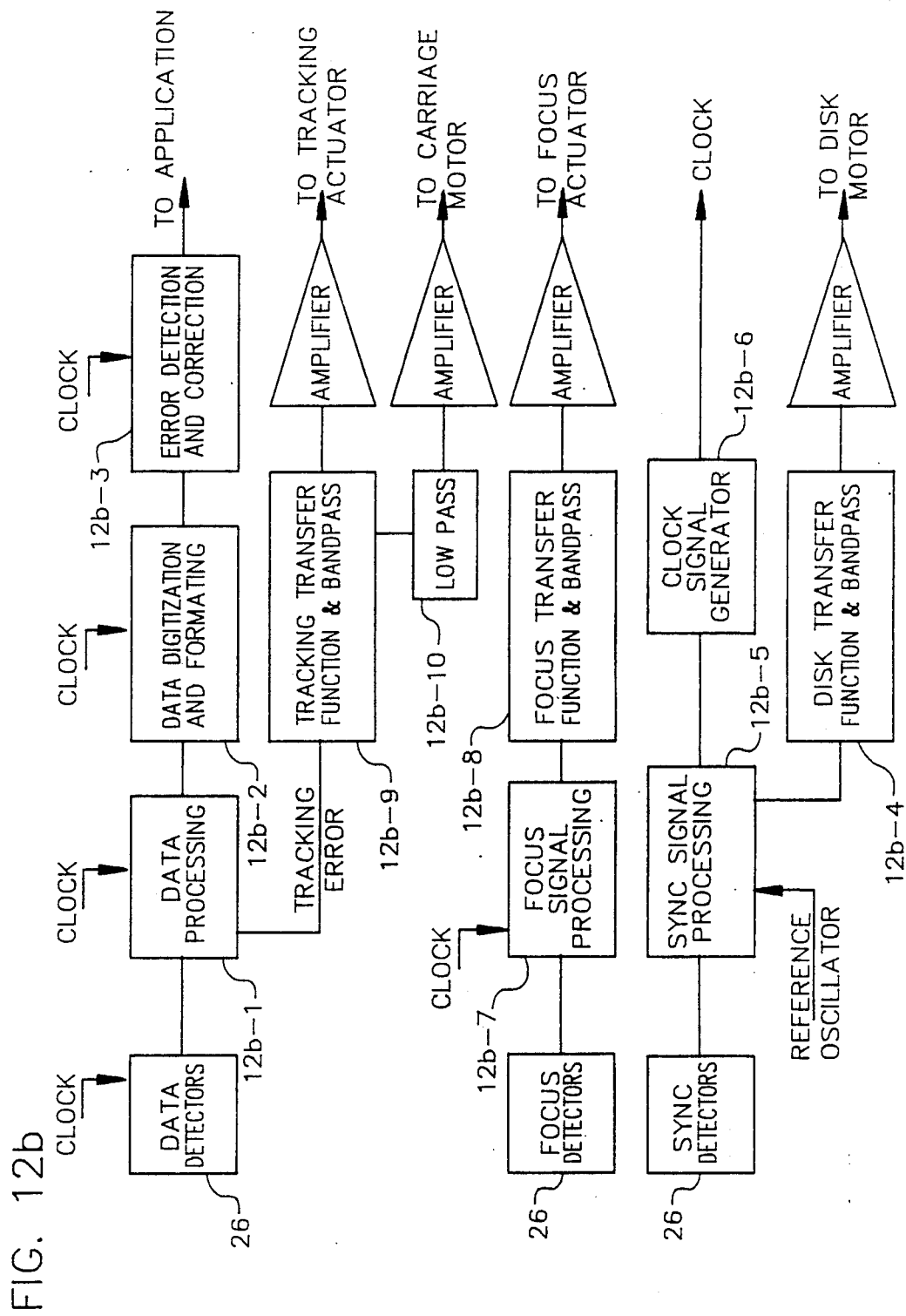
FIG. 12b is a block diagram of a suitable electronic control subsystem for operating the read optics of FIG. 8b during retrieval of data from the optical disc shown in drive 7.

A data word read from a set of marks will produce a multi-lobed pattern in a plane perpendicular to the track direction, as has been described. As shown in FIG. 12b, the data detectors of diode arrays 26 receive and process data at 12b-1 which may be implemented as described above and shown in FIG. 10 (or FIG. 11), and then conventional digitization and formatting of data occurs at 12b-2 followed by error detection and correction, 12b-3, again known per se. The thusly processed data is then output to the particular application equipment. At the same time, the light pattern in a plane parallel, i.e., longitudinal, to the track will be that of a single spot for each lobe. When the read beam is between sets of marks, the pattern in the longitudinal direction will be that of a very closely spaced two mark set, i.e., the side lobes will be very small and widely spaced, and the central lobe will be slightly larger but not as wide as a single spot.

Figure 12C:
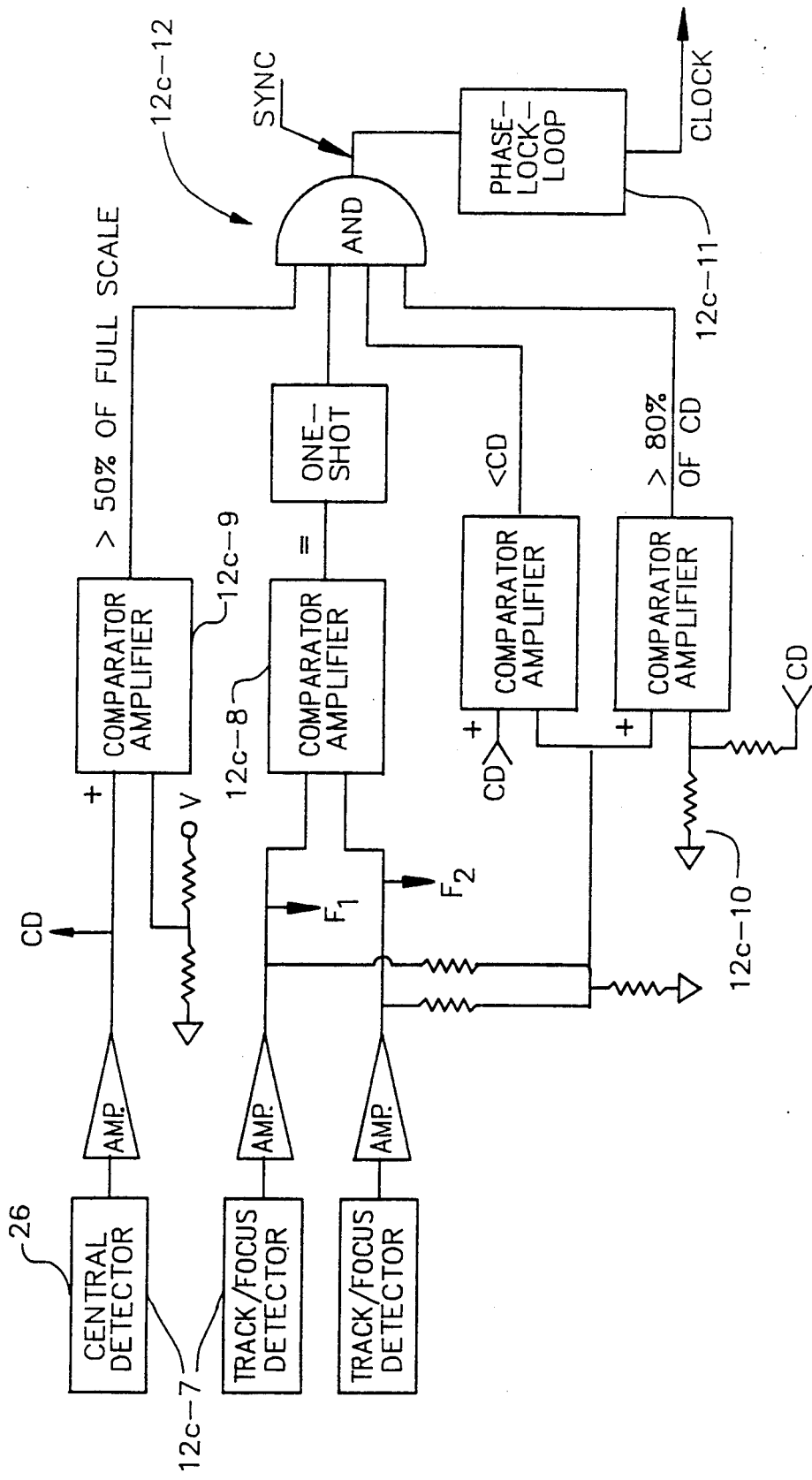

A synchronizing clock signal is developed by the sync signal processing shown generally in FIG. 12b to include sync detectors of array 26, processing 12b-5 clock generator 12b-6, and disc transfer function and bandpass 12b-4, and is shown in more detail in FIG. 12c. With reference to FIG. 12c, the sync detectors 12c-7 of array 26 are aligned parallel to the track, and are set so that when the beam is on the word, the detectors read the (one spot) central lobe, one on either side, at about 80% intensity points. Comparator amplifier 12c-8 between the track/focus detectors 12c-7 determines when the signals become equal and a pulse is then generated. If at the same time the central reference detector is high and larger than the sync signal as determined by comparator 12c-9, and the sync detector signal is at least half (ideally 80%) of the central reference as determined by comparators 12c-10, then AND logic 12c-12 determines that the signal condition represents a sync pulse, and it is passed on to the clock and timing circuits after stabilization by phase lock loop 12c-11. If the beam happens to be somewhere between words, the sync detectors may again be equal, but either the central reference will be low, or the sum of the sync detectors will be low, and no pulse will be passed on. Note from an examination of the pattern shapes as in FIG. 9 that the 80% intensity point on the single lobe pattern is about where there is a null in a two mark or three mark word.

Focus processing is shown generally in FIG. 12b as focus processing 12b-7, and focus transfer function and band pass 12b-8, and a suitable circuit for these functions is more specifically set forth in FIG. 12d. As shown in FIG. 12d, the focus detectors $F_1$ and $F_2$ can be the same as the sync detectors 12c-7. When sync occurs, the sum of the detectors $F_1$ and $F_2$ is compared linearly by differential amplifier 12d-1 to the central reference. If the detectors are too close to the record, the lobe will be narrower relative to the fixed spacing of the detectors and the ratio of the sum to the central will be small. If the detectors are too far away, the lobe is much broader and lower and the ratio will be large. In practice, the sum of the detectors would be scaled with a resistor attenuator so that at correct focus the sum and the central will be equal. Then a simple differential amplifier 12d-1 will indicate by a positive or negative signal approximately how far and in which direction the focus is in error and this value is gated via clocked analog gate 12d-2 to produce the sampled focus error for controlling read optics 23. The selection of the focus is arbitrary, since there is no distinct image plane as there is in conventional systems. The "focal" point is chosen so that the pattern is sized to match a convenient detector spacing, and the beam wave front is convex.

Tracking is carried out by the data processing depicted generally in FIG. 12b by tracking transfer function and band pass 12b-9 and a low pass integrator 12b-10 to produce tracking error signals for the tracking actuator and carriage motor, and a more detailed showing of this processing is set forth in FIG. 12e. The tracking signal in FIG. 12e is advantageously extracted from the data signal by taking the difference via differential amplifier 12e-1 between the left and right sets of data detectors 26. The function of tracking is to keep the center of the read beam and the center of the track coincident. If the track wanders away from the beam, the pattern will appear to shift in the opposite direction, and the detectors will no longer be symmetrically disposed with respect to the pattern and a tracking error signal results which produces a correction in the tracking actuator. The output of differential amplifier 12c-1 is selectively passed by clocked analog gate 12e-2 to the output line producing the sampled track error for the read control subsystem of FIG. 12b.

In overall operation it will be appreciated that the embodiment of the invention described above does not need word sync as a part of the recorded format, either segregated from or embedded in the data. Each set of marks, whether a three mark or two mark set, represents a multiple bit word. That word, which stores in analog form a range of values that is large enough to encode, for example, a ten-bit word, allows the entire word to be clocked as a whole by the presence of the central maxima 14a.

The accuracy of reading the information from record 10 is very high compared to popular optical recording systems As mentioned, the location of the side maxima which encode the signal information is determined by a ratio, and that ratio is easily corrected by conventional technology for intensity, and, in the case of a particular record, for temperature, wavelength, etc.

Different applications may require formatting the data on the record so that groups of words, hence groups of multi-mark sets 12, are set off by special calibration mark sets. These special mark sets are not used for data but for providing spacing calibration to identify groups of words. The calibration marks are distinguished from the data sets such as by gaps along the record in which no marks are made either before or after or both before and after the calibration sets as illustrated the three mark and two mark recordings of FIGS. 3 and 4. The calibration sets may be used to compensate for physical distortion of the record, e.g., thermal expansion or changes in the wavelength of the read or write beams, variations in spacing of the particular diode arrays used in the equipment, or other secondary effects. Although these effects are quite small, in those applications in which a relatively large amount of data is being stored in a given data mark set, the spatial resolution becomes more critical and the above compensatory operations are desirable.

ALTERNATIVE EMBODIMENTS

Figure 13:
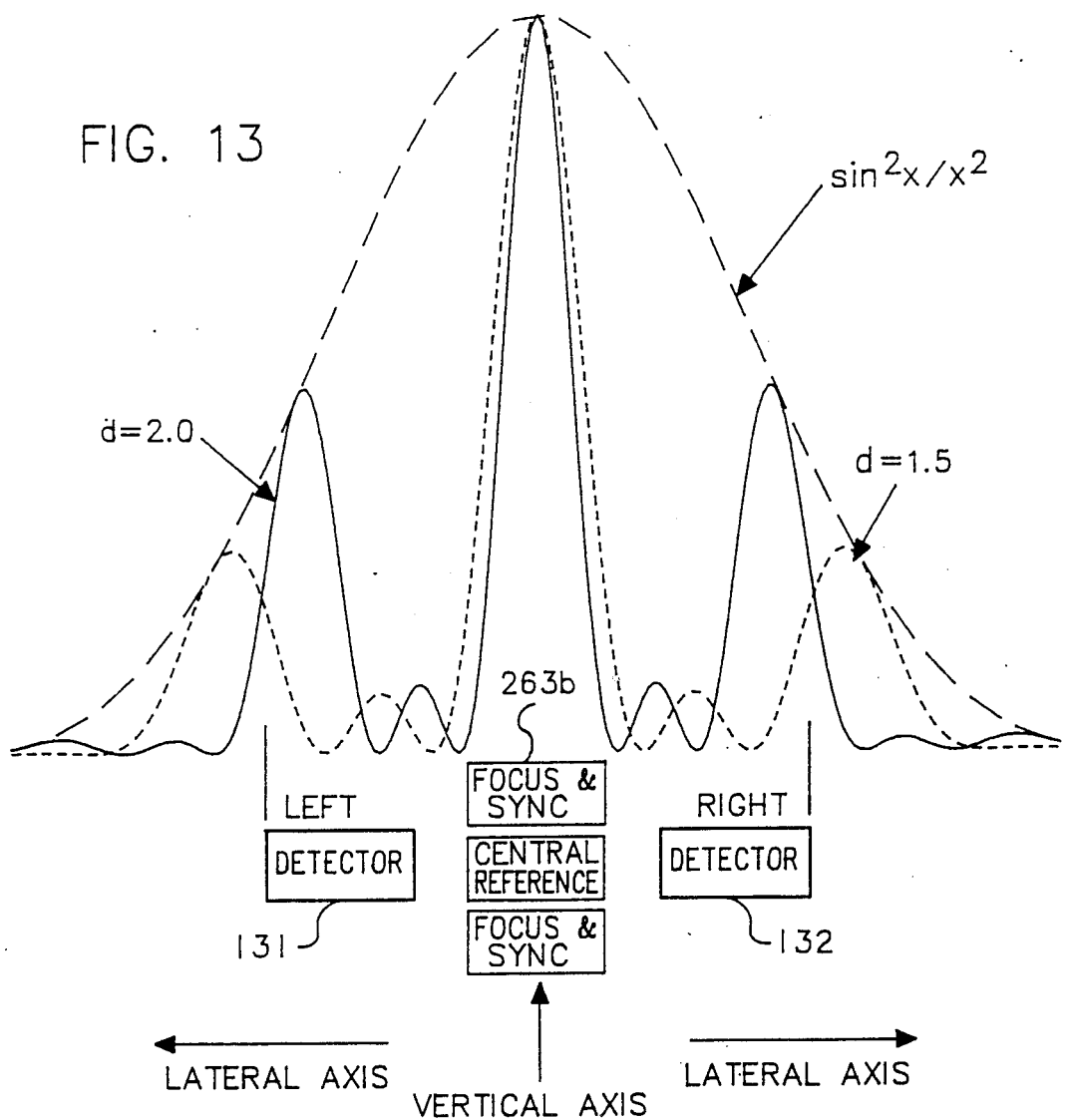
FIG. 13 is a diagram similar to FIG. 9 but showing an alternative arrangement of the detector diode elements of the diode array suitable for use in the read optics shown in FIG. 8b.

FIG. 13 shows an alternative detector array for the read optics in which the variable shifting of the side lobes of the read pattern is detected by single left and right detectors 131 and 132 respectively. The vertical detectors for focus, sync, and central reference remain the same as in the case of the preferred embodiment shown in FIG. 9. The design considerations for the alternative detector arrangement in FIG. 13 is based on the observation that many applications of the invention will involve relatively small amounts of side lobe movement. For example, it is anticipated that the first order side lobes will have a lateral range of about one width of the lobe itself. Thus, with the single detectors 131 and 132, the magnitude of the output signal will vary as an analog of the movement of the lobe across the detection window of the detector. Each of the left and right single detectors 131 and 132 will thus produce a variable amplitude output that is a function of the encoded data. Because the amplitude of the side lobe falls off as it moves away from the center according to $(\text{Sin}^2 X/X^2)$, the write process causes the marks to be spaced enough so that the read detectors 131 and 132 can be placed relatively close to the center axis to sense the side lobes at close to their maximum amplitude. The output signal will be compensated for the inherent fall-off in amplitude as the encoded lobes move outwardly in response to data modulation. Hence the transfer function (data/output signal) would not be linear but would be corrected, for example, by a physical light mask on the detector faces, or by electronic compensation in a signal processing network.

The two data detector embodiment shown in FIG. 13 is simple to construct and would permit low cost read equipment, such as for consumer applications. The signal to noise ratio suffers somewhat because not all of the light developed by the data encoded side lobes is used, i.e., it has moved partially off of the detector in order to create the analog output signal.

As a variation of the embodiment shown in FIG. 13, each of the signal detectors on the left and right sides of the center lobe can be provided with windows that span the entire width of the lobe movement. In this case the read signal will thus vary as a fall-off in the intensity of the lobe as it moves away from the center. The advantage is that the signal-to-noise ratio will be better, although the detectors will be larger.

A still further variation of the embodiment shown in FIG. 13 is to split each of the single left and right side detectors 131 and 132 into a pair of elements on each side. The split between the detector elements would be substantially at the mid-point of the lobe lateral movement. There are three additional detectors at the center of the assembly for focus, synchronization, and if necessary, AGC. The ratio of the output signals from each side pair detectors would be performed by the electronic read signal processing. The ratio of the output to signals would then be corrected by means of a look-up table for fall-off in intensity. The ratios of the detectors on both sides of the center axis can be summed for the data signal, and the difference between the signals on opposite sides of the center axis can be used for the tracking error generation. This particular variation would require seven detectors, hence more than the above alternative embodiment; however, the accuracy and stability should be somewhat better. As alternatives to the read optics 23 shown in FIG. 8b, different configurations are illustrated in FIGS. 14, 15 and 16. In the preferred optics 23, the encoded data is read by reflections off one surface of record 10 when the track data sets are illuminated in response to laser 240. An alternative arrangement would provide for a transmissive encoding and read record as shown in FIG. 14 with the data plane being alternately transmissive and opaque at the sets of marks. Thus, a laser diode and associated collimator and objective lenses are arranged to illuminate the track from one side of the record and the transmitted light, including the encoded interference pattern, is focused by an objective lens on the detector array.

FIG. 15 shows an alternative reflective read system in which the read beam emanating from the laser diode and collimator is oriented so that the beam converges to a small spot at an angle to the data plane. The return or read pattern illuminates the detector directly at a reflective angle off of the track. The entire assembly would be moved for track and focusing. It is observed that this embodiment lends itself to fewer optical components than compared to the preferred embodiment shown in FIG. 8b and the alternatives in FIGS. 14 and 16.

A variation of the embodiment shown in FIG. 15 would provide a relay lens between the record and the detector and laser assemblies. The relay lens would form an image of the data at the prior record location and would move for track and focus.

Still another arrangement is illustrated in FIG. 16 in which the laser diode source light and the read detector array share an objective lens without overlapping. The advantage is that no beam splitter or quarter wave plate is required; the disadvantage is that the NA for the read beam is half that of the objective lens in the direction that a high NA is needed most, i.e., parallel to the track, but this embodiment would work for certain low density record applications.

Figure 19:
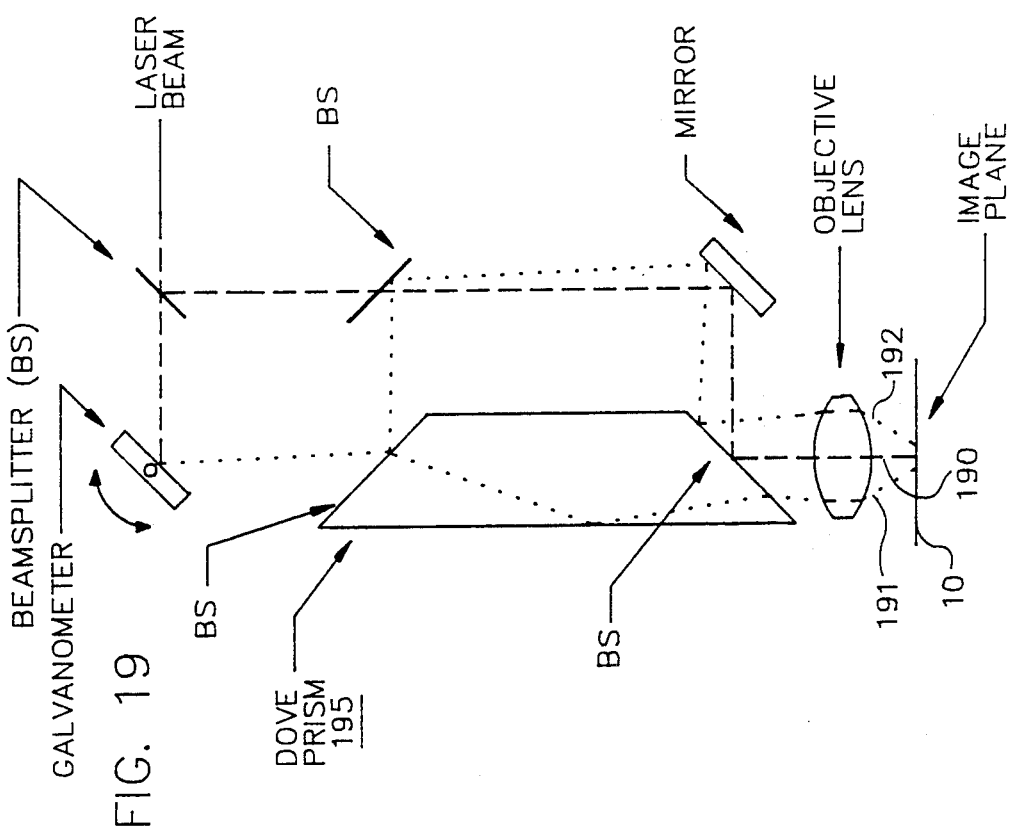
Figure 18:
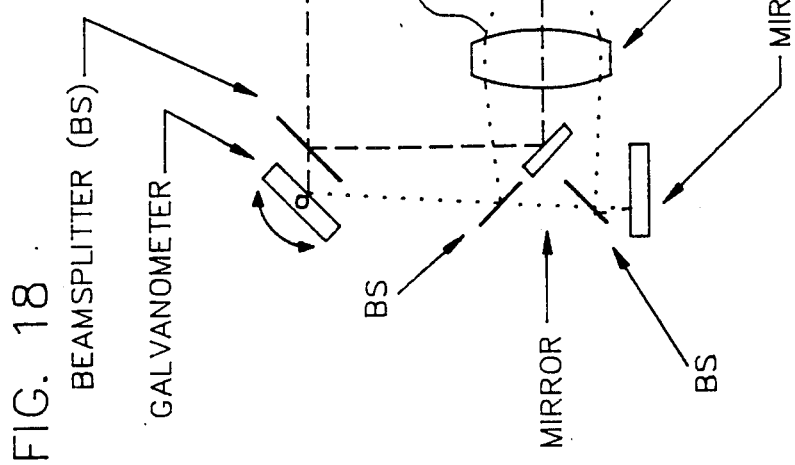

FIGS. 17, 18 and 19 illustrate various embodiments suitable for the write optics. As an example, FIG. 17 illustrates in greater detail the preferred embodiment of write optics 15 of FIG. 8a in which the beam divider and deflector assembly is provided by an acousto-optic cell 171 and associated optics, including beam shaping cylinders 172 and a cylinder lens 174 to correct for astigmatism. Acousto-optic cell 171 is a known device having a piezo-electric plate 175 at one end of the cell to which the preprocessed information signal, here an RF signal frequency modulated by data $S_i$. Variable standing waves are formed in the cell 171 which create a diffraction grating that splits the laser light beam and modulates the amount of angular deviation of the split beam as it emerges from cell 171. For a three mark encoding format (FIG. 3), both the side beams and the center beam are used at the output acousto-optic cell 171. For a two mark encoding format (FIG. 4) one of the beams is blocked or otherwise diverted from the recording operation so that only two beams at variable angle of divergence are transmitted to the record 10. The other elements of the record optics as shown in FIG. 17 are the same as described in connection with FIG. 8a.

As an alternative, the write optics may be provided by a galvanometer deflection assembly as shown in FIG. 18. A collimated source laser beam, such as from a laser diode, is passed through a beam splitter to form orthogonal beams, one of which is then deflected by a mirrored galvanometer surface. The thusly formed beams are divergent as a function of the galvanometer which will move in accordance with the encoded signal information. The galvanometer deflected beam is then passed through successive beam splitters and reflected by a mirror in order to create equal and opposite side beams 181 and 182. A center beam 180 passing through the same objective lens is formed by an angled mirror that receives the laser light beam formed at the initial beam splitter as illustrated. Thus, a pattern of beams in which side beams 181 and 182 are angularly modulated by the angle position of galvanometer form on equal and opposite sides of the center beam 180, thereby enabling the formation of a three mark set on the surface 10 of the record. Such an electromechanical recording system does not provide as broad a bandwidth as the acousto-optical recording system of FIG. 17 or the diode array recording schemes of FIGS. 20 and 21 discussed below but is suitable for many low data rate or non-real time recording applications and is less costly than other schemes. Another alternative is to replace the galvanometer mirror with a piezo-electric mirror in those embodiments in which the amount of angular deflection is small. Still another alternative is to use an optical fiber deflector as disclosed in my prior U.S. Pat. No. 3,941,927.

FIG. 19 is a variation on the galvanometer deflector of FIG. 18. In the embodiment of FIG. 19, the beams formed by the successive beam splitter and mirrored galvanometer are applied to an optical system including a Dove prism 195 that provides an odd number of reflections. The other beam reflected off the partially reflective surface of the leading face of the Dove prism goes through another system of mirrored surfaces including a reflective surface of a beam splitter, an angled mirror and is finally reflected off a trailing partially reflective face of Dove prism 195 so as to undergo an even number of reflections. The beams are then combined in an objective lens to form the center beam 190 and two angularly modulated side beams 191 and 192 for forming the three mark set on the data plane of record 10. Because of the even/odd relationship of the beam path reflections, the side beams deflect in the opposite directions as the galvanometer moves in response to the encoding input data. In providing this system, the path links of the various beams must be properly designed so that the apparent center of rotation of the two side beams are coincident to provide equal and opposite movement of the side beams. As an alternative to the embodiment shown in FIG. 19, the two different optical paths could each use a Dove prism, with one such prism being rotated 90° relative to the other. Thus one beam would be rotated 180° relative to the other, giving the equal and opposite deflections.

Figure 20:
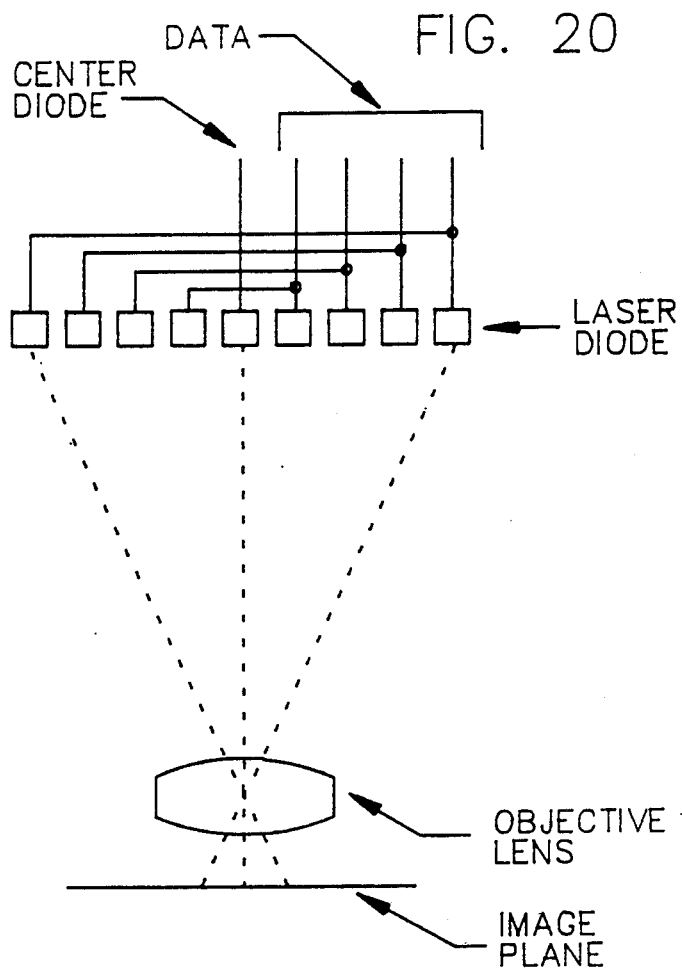
FIGS. 20 and 21 show a type of discrete optical recording optics and laser diode light sources for use in alternative write optics.

FIG. 20 illustrates a significantly different write optics subsystem in which the angular modulation of the multiple beams is caused by selective energization of different ones of an array of source laser diodes. The middle diode of the array is pulsed at each word, i.e., set of marks, and a pair of diodes on opposite sides of the center diode would be pulsed at the same time to record the information signal $S_i$. There would thus be twice as many outboard diodes as the number of analog levels that are to be used for encoding the information signal. The light output from the recording diode array is imaged onto the recording surface of record 10 by a suitable objective lens or lens assembly to form the three (or two) of each data set.

Figure 21:
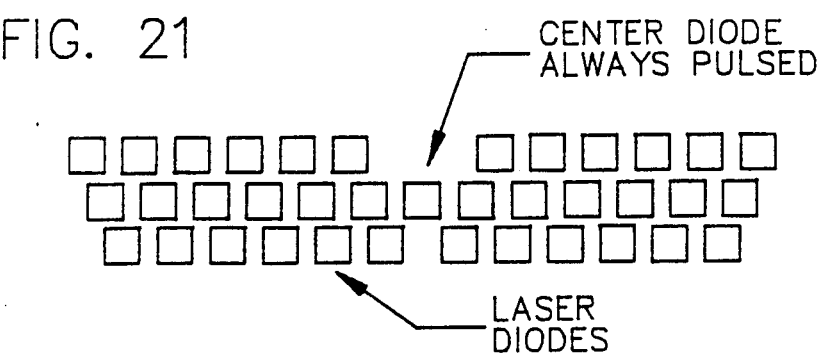

A related alternative embodiment is shown in FIG. 21 in which the recording laser diodes are arrayed in offset groups as shown to enhance the resolution of the recording. By using a stack of three rows of laser diode arrays, each row being offset a third of the width of a diode from the adjacent row, it is possible to generate recording beams that vary in steps one-third of the variations permitted by the sequenced recording diodes of FIG. 20. The deviation of the arrays of diodes along the record is not significant because, as in FIG. 20, the size of each mark on the record is constrained by the lens diffraction, as set by the NA of the objective lens. Accordingly, the actual size of the marks when referenced to the diode array would be many times larger than the diode element spacing. The center reference diode is only required for the centermost row of the offset arrays as illustrated.

The laser diodes of FIGS. 20 and 21 may be formed into an integrated electro-optical circuit with the proper set of three diodes of the integrated circuit array being energized in response to the stream of information data to be encoded.

Figure 22:
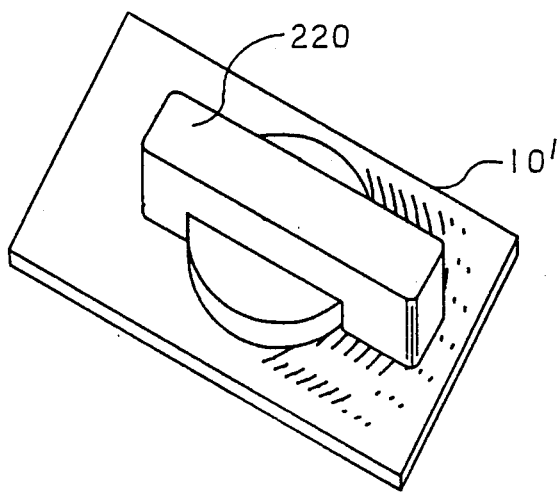
FIG. 22 shows an isometric view of an alternative drive for storing the encoded information onto semicircular arcuate tracks on an optical storage card of generally rectangular configuration by using an oscillating arm that carries the write/read optics.
Figure 23:
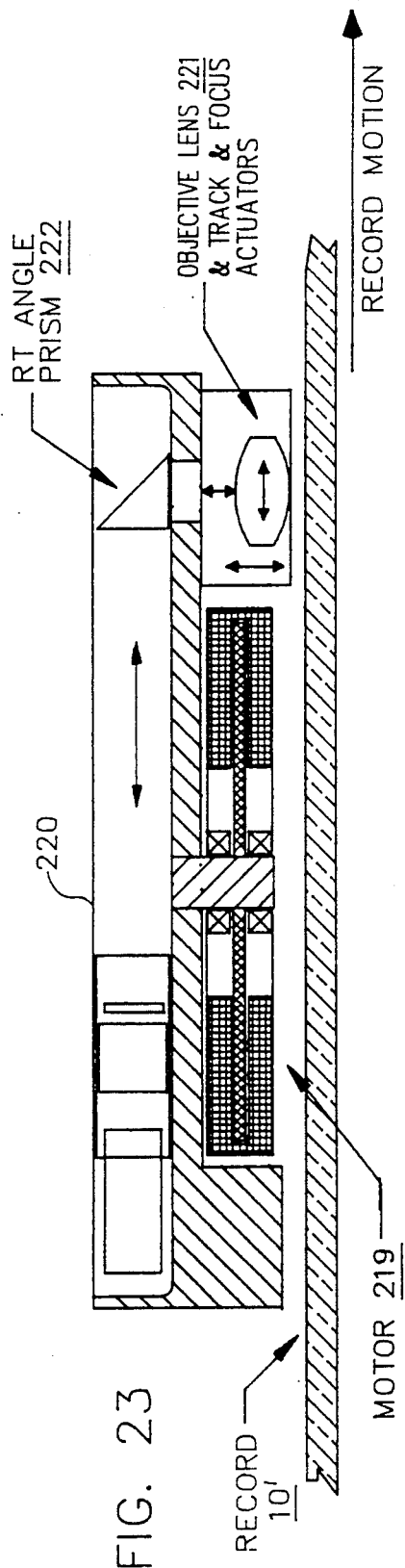
FIG. 23 is a detailed view taken as a vertical section through the alternative oscillating arm drive shown in FIG. 22.
Figure 24:
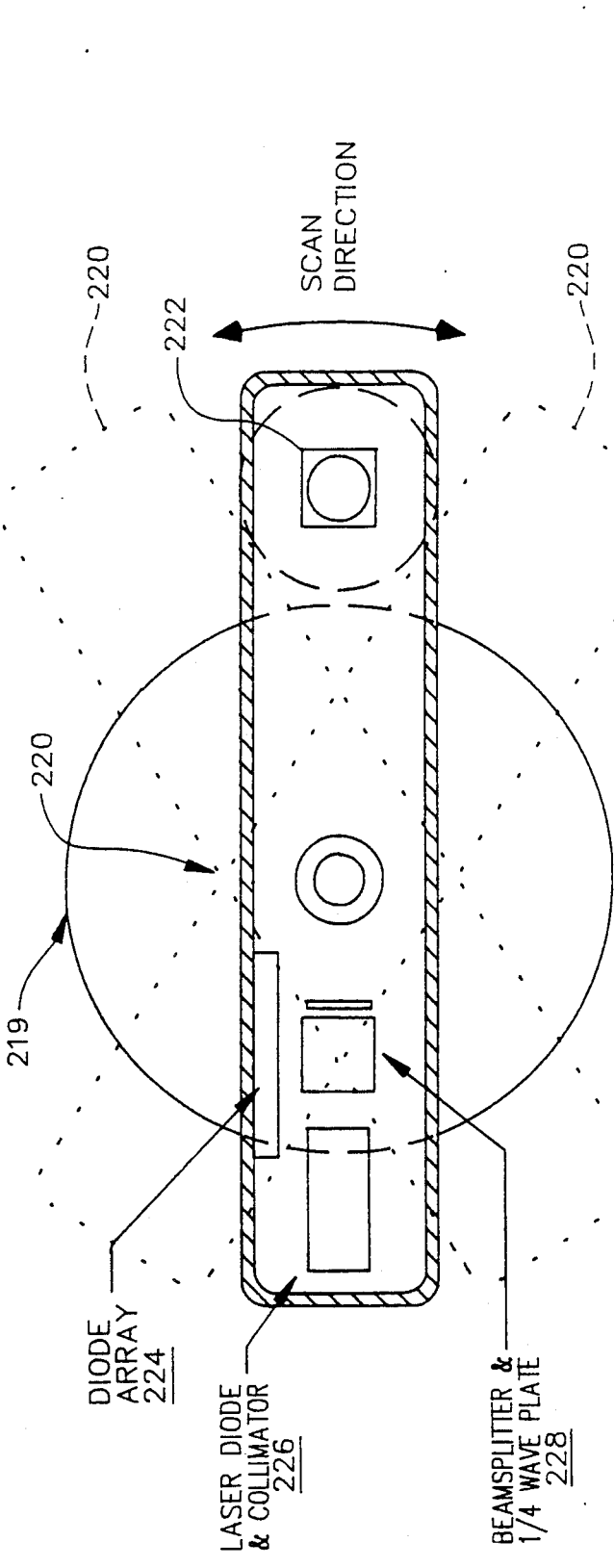
FIG. 24 is a sectional view taken along a horizontal plane cutting through the oscillating drive arm shown in FIG. 23.

Alternatives exist for the drive mechanism itself. FIGS. 22, 23 and 24 show a quite different drive mechanism in which the recording track is formed as a series of arcuate, semi-circular segments arranged on a rectangular record 10'. An oscillating read-write arm 220 pivoted on a spindle passing centrally through the arm as best seen in FIGS. 23 and 24 causes the track to be written and read during oscillations about the pivot (see dotted line positions of arm 220 in FIG. 24) as the record 10' in the form of a rectangular card is transported in a plane parallel to the arm and perpendicular to the arm pivot axis. Mounted within the read/write arm 220 are the objective lens 221 including suitable track and focus actuators (not separately shown) disposed at one end of the arm, and focusing the read beam and reflections into a right angle prism 222 (alternatively a right angle mirror). The interference pattern containing the encoded data is thus turned at right angles by prism 222 to illuminate the read detectors in the form of diode array 224 arranged at the opposite end of arm 220 from the objective lens 221. Also at the diode array end of arm 220, the source laser diode and collimator assembly 226, and a polarized beam splitter with the one quarter wave plate 228 are arranged to accommodate the source read beam as well as the reflection optical path in the same optical axis of arm 220. Write optics (not separately shown) may also be mounted in arm 220 for recording. An arm drive motor 219 provides the drive oscillations to arm 220.

Alternatively, the record element 10' of FIGS. 22–24 can be extended to form a long strip or tape. The data tracks on such tape may be arcuate as recorded and read by mechanisms 22–24, or they may be straight-line line segments transverse to the long axis of the tape, or multiple longitudinal tracks as written and read by other mechanisms known in the art.

Figure 25:
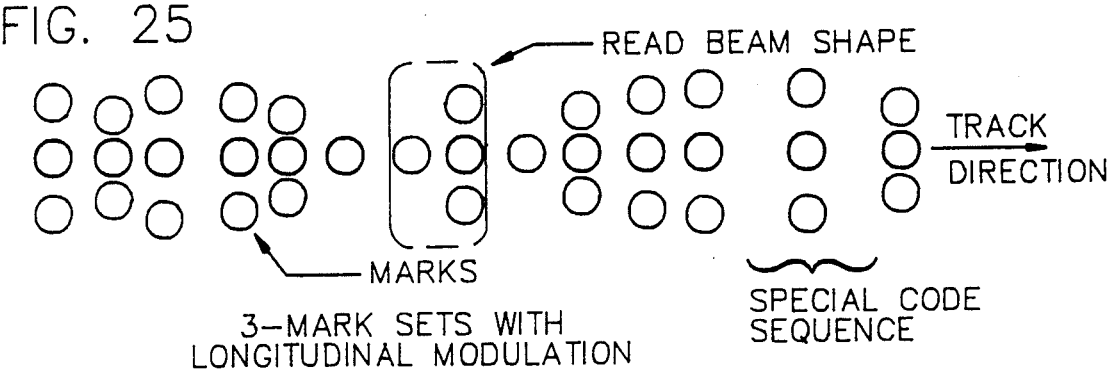
FIG. 25 is a diagramatic view similar to FIGS. 3 and 4 showing another alternative format of the data encoding marks in which an additional data channel is formed by variable spacing of mark sets along the track as well as transverse to the track.

In certain applications, it may be desirable to record data in the form of longitudinal variations of the mark sets along the track length. Again, the multiple marks, such as a pair of marks oriented along the track, will produce a light interference pattern when a read beam illuminates two or three mark sets oriented along the track at variable separation. This recording format is shown in FIG. 25 which should be compared with the transverse only encoding format of the three and two mark sets of FIGS. 3 and 4. In the case of the three mark variations along the track scan line, clocking becomes somewhat more difficult for the longitudinal data. Since not every mark along the track can be used for clocking, because of the variable spacing that encodes the data, alternative clocking control must be provided. For example, every third mark of a three mark longitudinal set can be used for clocking. One advantage of using variable spacing along the track to encode the data (assuming no transverse data sets) is that a record recorded in this manner can be made physically compatible with existing records such that a new reader drive can be used not only for reading existing records recorded with prior art techniques, but also for reading records recorded by means of the variable light interference pattern of the present invention.

The central string of marks, i.e., the mark that is always there, will generate a double slit pattern in a direction orthogonal to the data bit axis, or longitudinal to the direction of the track, during the transition between data words. When the reading beam is in between two words, what one might call vertical lobes will be generated. These could be used for three purposes, at least: (1) If the spacing along the track is ideally constant, then the spacing of the first order lobes will measure the focal position, and measured spacing may be used to generate a continuous servo signal for the focus circuit. (2) However, if the spacing is not so certain due to media distortions, the lobes would indicate that distortion and could be used to correct the data. (3) If the distortions are negligible, the spacing along the track could be varied a small amount to add an additional data channel. Such an embodiment is shown in the data format of FIG. 25 described below. The clocking for this additional data channel can be generated in the same way as before, i.e., an auxiliary detector that detects the location of one of the central bits.

Alternatively, the longitudinal data detector itself can register when the two lobes are balanced. Note that this data encoding channel along the track is a two mark system.

The side marks on the transverse words (the original three mark word sets) will also generate lobes during the read transition. The direction or angle of the lobes will be set by the difference in position between the adjacent words. The angle is a measure of the data difference, and can be used as a data readout. The detector array would need to be circular, or otherwise measure angular readout.

Another alternative, not specifically shown in the drawings, is to use a read system without lenses. The interference pattern inherently spreads out from the set of marks with an included angle of up to about 60°. In such case, the detectors may be placed, for example, at 4 mm away from the record and sized in the range of 4 to 5 mm long to effectively sense the diverging interference pattern. This configuration represents a convenient size for the array and for each detector element of the array. The interrogating beam is somewhat more difficult to provide because the area of the record to be illuminated is only three or four microns wide so that without a collimating/focusing lens, the source laser diode must be very close to the record surface. Nevertheless, such an arrangement can be accommodated with a sufficiently strong laser output, using the detectors with read signal processing to sort out the reflected or transmitted interference pattern.

Alternative techniques can be used for writing data onto record 10 that differ somewhat from the open loop process described above in connection with FIG. 8a. For example, the record can be pre-grooved which is a common technique for establishing the record track. Another alternative is to read a previously recorded track to serve as a guide for recording the adjacent track. Still another variation is to use an auxiliary diode detector and associated light source that is displaced by a predetermined amount in order to use a previous track as a guide. The record may be preformatted with just a single center spot for the center of the track of a three mark record (see FIG. 3). The pre-grooved record and the preformatted record require that the recording light be offset at least one word position along the track so that a read-only source and associated detector can track on the center spot or on the preformed groove without interference from the write beam. Alternatively, a different wavelength read laser diode can be used to track and focus without interference with the write optics.

As examples of typical density and performance specifications, it is assumed that each mark recorded on the record is a spot one micron in diameter and that a three mark data set or word is used (the format of FIG. 3).

The center-to-center spacing of the marks transverse to the track will vary from 1.5 to 2 microns, i.e, there will be between 0.5 and 1 micron space between the marks, edge to edge. The track to track spacing (center of track to center of track) would be 5 microns. In the worst case, adjacent words would just touch, but will not significantly interfere because the adjacent word marks are not illuminated enough.

A detector arrangement such as the ratio of pairs or linear diode array can measure the spacing of the side lobes to 1 part in 1024, i.e., 10 binary bits. The periodic calibration words help maintain accuracy. Then each word location along the track can store 10 times as many bits as a conventional single mark. However, the net increase in storage is not that large because the track is wider. In conventional practice with 1 micron marks, the track to track spacing would be 2 microns. Therefore, the net gain in bit storage density would be (10)(2/5)=4 times. The data rate would be 10 times.

However, the spacing along the track can vary as well. The spacing would be interpreted as a two mark system, as set by the size of the reading beam in the longitudinal direction. The center to center spacing would vary between 1.5 and 2 microns. Conventional practice would put the marks on a 1 micron spacing, just touching. The storage increase in the longitudinal direction would be $(10)(1/1.75) = 5.7$. So the overall net increase in density will be $(4)(5.7) = 22.8$ times. The net increase in data rate will be $(10)(10/1.75) = 57$ times.

As a second example, if a two mark transverse word is used, the track to track spacing will be 3 microns instead of 5, so the transverse density increase will be $(10)(\frac{2}{3}) = 6.7$ times. The data rate would still be 10 times. In this case, the overall net density increase including longitudinal encoding will be $(6.7)(5.7) = 38.2$ times.

In conventional optical storage, the data are specially encoded to reduce the DC content of the bit stream, to provide enough bits for tracking and focus, and to reduce the intersymbol interference. In the case of the Compact Disc, an 8 bit data word is recorded as 17 bits, plus ecc and other codes. The new scheme of the present invention does not have DC or track problems, and ISI is greatly reduced, so all examples above should be times $17/8 = 2.13$, for a maximum density of $(38.2)(2.13) = 81.4$, and data rate of 121.

These factors depend on the wavelength of the light used for read-out and on the accuracy of the measurement, and by no means represent the best that might be done.

Although read and write beams have been described as being in the visible or near-visible wavelength range, the invention may use electromagnetic energy ranging from infra-red through ultra-violet.

DETECTOR ASSEMBLIES

It is contemplated that the diode detectors, transfer registers (if used), detector amplifiers, analog switching, A/D convertors, look-up tables for ratios and corrections, and associated logic would be fabricated on one integrated chip or very closely juxtaposed chips. That is, all elements related to extracting the raw data and converting it into a digital or sampled analog signal should be on the same chip or hybrid substrate. The downstream circuits that do error correction, formatting, servo, etc., can be elsewhere.

The reasons to put as much on a chip as possible are, first, to gain speed. One of the advantages of this new optical technique is much higher data rate. But this is a hollow advantage if the data extraction circuitry cannot match that speed. The second reason is cost, because as any other large scale integration, the cost per circuit goes down as the number of circuits per chip goes up.

There are various ways to do the chip(s). One way would be to place the detectors and transfer registers on one side of a silicon chip, and the logic on the other, with diffused connections through the chip. The advantage to this, besides saving real estate, is that the processing steps are different for detectors vs logic, so processing is more efficient. Another reason is that of speed: the connections would be short. A second way would be to make the circuits on separate chips, then use the "flip-chip" process, one chip welded to the other or to an intermediate substrate with indium (or equivalent) dots, to make connections. This has the advantage that each type of circuit, actually each chip, can be tested before combining.

STORAGE MEDIA

The recording itself can be either transmissive or reflective. In the transmissive mode the data spots are transparent, and the reading light beam is on the opposite side of the record from the detector assembly. In the present art, the data layer of a record could be a thin metal such as tellurium, a dye or dye-polymer layer, or even a fine grain photographic emulsion that has been processed to a positive image. The main advantage of a transmissive record is that the signal/noise is better than a reflective system, and the optics are simpler. The main disadvantage is that the structure is more bulky. In the old art, tracking and focus errors were much more difficult to measure in transmission systems, but in my new art these errors are easily obtained, in fact they almost come "for free".

Reflective records are more common in the old art, e.g., the CD. In the new art, it is necessary to have reflective spots or areas that perform the same function. In the case of writeable material, if the material is inherently reflective and the writing operation produces a black spot, then the writing operation must make spots such that the remaining material between the spots become the required reflective "spots". That is, if three-spot data word is desired, four spots must be written, where the width of each written spot is variable. The areas between them become the reflective spots with variable location. Note that the extreme edges of the first and fourth spots can touch those of the adjacent track, as those edges are not part of the data.

Some writeable material is just the opposite. The material is non-reflective, and the writing operation produces reflective spots. Such materials would include dye-polymer material or any other absorptive coating on a mirror backing, the commercial material called Plasmon, or anti-reflection coatings on a reflector (sometimes called "trilayer").

Magneto-optic materials can be either type depending on how the polarizers are set.

Records that are made from a master by injection molding such as the CD are a special case. There the material when coated is reflective, spots and all. The spots are $\frac{1}{4}$ wave above the surrounds so that the light reflected from the spots interferes with light reflected from the nearby surrounds, and the spot appears dark. Energy is not absorbed, it is just scattered out of the collection path. In the new art, the record can be made in the same way, but the interference between spots will be collected by the objective lens. This is so because the greater spacing of the spots will generate a narrower pattern than the closer spot and land interference. In addition, the land surface can be made rough to absorb and scatter unwanted light away from the lens.

CONCLUSION

While all the particular embodiments have been disclosed herein, it will be readily apparent to persons skilled in the art that numerous changes and modifications can be made thereto, including the use of equivalent means, devices and method steps, without departing from the spirit of the invention.

What is claimed is:

1. A system for recording information onto and reproducing such information from an optical storage medium, comprising:
    recording means for writing information onto an optical storage medium, including means for forming along a record track a plurality of sets of spaced apart marks in which the information is encoded by variable spacing of the marks generally transverse to the record track;
    reproducing means for retrieving information from an optical storage medium having said plurality of sets of variably spaced marks along a record track, including a source of light that is adapted to be directed at the sets of marks so as to form an optical interference pattern in which variable spacing between maxima and/or minima of such interference pattern represents said variable spacing of the sets of marks; and said reproducing means further including photosensing means adapted to be disposed for receiving light from said optical interference pattern so as to convert light from said variable interference pattern into an electrical signal representing said information.

2. The system of claim 1, wherein said recording means comprises an acousto-optical deflector.

3. The system of claim 1, wherein said recording means comprises an array of controllable light elements and optic means for imaging light from said elements onto the optical storage medium.

4. The system of claim 1, wherein said photosensing means of said reproducing means comprises an array of solid state photosensitive elements.

5. The system of claim 1, wherein said source of light of said reproducing means comprises a laser diode.

6. The system of claim 1, wherein said recording means comprises means for forming said sets of variably spaced marks in groups of at least three such marks, each set of marks arranged transverse to the information track and including a center mark and a pair of side marks, the locus of said center mark of said sets being disposed along the center of the record track.

7. A system for recording information onto an optical storage medium, comprising:

recording means for writing information onto an optical storage medium, including means for forming along a record track a plurality of sets of spaced apart marks in which the information is encoded by variable spacing of the marks generally transverse to the record track, whereby the recorded information may be retrieved by sensing an optical interference pattern formed by illuminating each said sets of marks with a light source.

8. The system of claim 7, wherein said recording means comprises an acousto-optical deflector.

9. The system of claim 1, wherein said recording means comprises means for forming said sets of variably spaced marks with at least certain of said sets having two such marks, each set of marks arranged transverse to the information track.

10. The system of claim 9, wherein said recording means comprises means for forming said sets of two marks so that said marks are disposed on substantially equal and opposite sides of a center axis of said information track.

11. The system of claim 1, wherein said recording means further comprises means for forming said sets of spaced apart marks so that said marks encode information by variable spacing between said sets along the length of said record track, and said reproducing means comprising means for retrieving encoded information from reproduction signal channels representing optical interference patterns associated with both variable spacing of said sets of marks transverse to said track and variable spacing between said sets of marks along said track.

12. A system for recording information onto and reproducing such information from an optical storage medium, comprising:

recording means for writing information onto an optical storage medium, including means for forming on a record track a plurality of sets of spaced apart marks in which the information is encoded by variable spacing of the marks in said sets;

reproducing means for retrieving information from an optical storage medium having said plurality of sets of variably spaced marks on a record track, including a source of light that is adapted to be directed at the sets of marks so as to form an optical interference pattern in which variable spacing between maxima and/or minima of such interference pattern represents the encoded information; and said reproducing means further including photosensing means adapted to be disposed for receiving light from said optical interference pattern for converting said maxima and/or minima into an electrical signal representing said encoded information.

13. The system of claim 12, wherein marks in each of said sets are variably spaced in a direction generally transverse to the record track.

14. The system of claim 12, wherein said marks of each set are variably spaced along a direction generally along said record track.

15. The system of claim 12, wherein said sets of variably spaced marks include at least one set having said marks variably spaced along a direction generally transverse to said record track, and at least one other set of said marks having variable spacing along a direction generally longitudinal of said record track, whereby different information encoding channels are provided by said transverse and longitudinal spacing of marks.

16. A method of recording information onto and reproducing such information from an optical storage medium, comprising the steps of:

writing information onto an optical storage medium by forming on a record track on such medium a plurality of sets of spaced apart marks in which the information is encoded by variable spacing of the marks in said sets; and reading information from an optical storage medium having said plurality of sets of variably spaced marks on a record track by illuminating said sets with a coherent source of light so as to form an optical interference pattern in which spacing between maxima and/or minima of such interference pattern represents the encoded information; and photosensing light from said optical interference pattern to convert said maxima and/or minima into an electrical signal representing said encoded information.

17. An optical storage medium having a plurality of sets of spaced apart marks recorded in accordance with the method of claim 16.

18. An optical storage record, comprising:

an optical storage medium having formed thereon a record track in which a plurality of sets of spaced apart marks are made along said record track for encoding information in an optical interference pattern produced when said marks are illuminated by a source of coherent light.

19. The optical storage record of claim 18, wherein said marks of at least certain of said sets are spaced apart within a range of 2 to 4 times the wavelength ($\lambda$) of the illuminating source of coherent light.

20. A sytem for reproducing information from an optical storage medium, comprising:

a source of coherent light adapted to be directed at a set of prerecorded marks on an optical storage medium so as to form an optical interference pattern in which information is stored in variable spacing between maxima and/or minima of such interference pattern; and photosensing means adapted to be disposed for receiving light from said optical interference pattern for converting said maxima and/or minima into an electrical signal representing the encoded information in said prerecorded sets of marks.

21. The system of claim 1, wherein said optical storage medium comprises a disc record having said record track formed substantially concentrically on said record, and further comprising a drive including rotation means for rotating said disc record about its center axis, and carriage means for mounting said recording means and said reproducing means for movement radially of said disc record.

22. The system of claim 1, wherein said optical storage medium comprises a generally planar record, and further comprising a drive means including an oscillating arm means carrying said recording means and reproducing means and a record transport means for moving said planar record past said oscillating arm means to record and reproduce information on said record track that is formed as a series of arcuate track segments.

23. The system of claim 1, wherein said recording means comprises an electro-mechanical deflector means for position modulating at least one recording light beam.

24. The system of claim 23, wherein said electro-mechanical deflector means includes a galvanometer.

25. The system of claim 23, wherein said electro-mechanical deflector means comprises a piezo-electric transducer.

26. The system of claim 1, wherein said photosensing means of said reproducing means comprises an array of photoelectric solid state elements arranged in a predetermined array relative to said optical interference pattern for sensing said maxima and/or minima and producing representative electrical detection signals in response to said optical interference pattern.

27. The system of claim 26, wherein said array of photodetection solid state elements comprises a first sub-array oriented transverse to the record track for sensing said maxima and/or minima, and a second sub-array oriented along the length of said track for responding to light from said sets of marks for controlling said reproducing means.

28. The system of claim 1, wherein said sets of marks determine the reflection of light from a surface of said optical storage medium, and said reproducing means comprises means for directing said source of light at said surface of said medium, and said photosensing means being disposed for receiving said optical interference pattern as reflections from said surface of said medium.

29. The system of claim 1, wherein sets of marks determine the transmission of light through said optical storage medium from one side to the other, and said reproducing means comprises means for directing said source of light so as to illuminate said sets of marks from one side of said medium, and said photosensing means being disposed for receiving said optical interference pattern from the other side of said medium.

30. A system for reproducing information from an optical storage medium, comprising:

a source of coherent electro-magnetic energy adapted to be directed as a beam at a set of prerecorded marks on a storage medium so as to form a wave interference pattern from said electro-magnetic energy interacting with said set of marks in which information is encoded in variable spacing between maxima and/or minima of such wave interference pattern; and electro-magnetic energy sensing means disposed for receiving said wave interference pattern for converting said maxima and/or minima into an electrical signal representing the encoded information in said prerecorded sets of marks.

* * * * *